(12) United States Patent
Aggarwal et al.

(10) Patent No.: US 10,748,250 B2
(45) Date of Patent: Aug. 18, 2020

(54) METHOD AND APPARATUS FOR MANAGING IMMERSIVE DATA

(71) Applicant: SAMSUNG ELECTRONICS CO., LTD., Suwon-si (KR)

(72) Inventors: Rahul Aggarwal, Dehradun (IN);
Aneet Kaur Chhabra, Jabalpur (IN);
Abhinav Purwar, Katni (IN); Viral Harendra Upadhyaya, Vadodara (IN);
Praharsh Ivaturi, Mumbai (IN)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 16/217,941

(22) Filed: Dec. 12, 2018

(65) Prior Publication Data
US 2019/0188828 A1 Jun. 20, 2019

(30) Foreign Application Priority Data

Dec. 14, 2017 (IN) .............................. 201741045031

(51) Int. Cl.
| | | |
|---|---|---|
| G06T 3/40 | (2006.01) | |
| G06T 3/00 | (2006.01) | |
| H04N 19/597 | (2014.01) | |
| G06T 15/20 | (2011.01) | |

(52) U.S. Cl.
CPC .......... *G06T 3/4092* (2013.01); *G06T 3/0087* (2013.01); *G06T 15/205* (2013.01); *H04N 19/597* (2014.11); *G06T 2200/16* (2013.01); *G06T 2210/36* (2013.01)

(58) Field of Classification Search
None
See application file for complete search history.

(56) References Cited

U.S. PATENT DOCUMENTS

| | | |
|---|---|---|
| 6,118,474 A | 9/2000 | Nayar |
| 8,587,589 B2 | 11/2013 | Collomb |
| 9,721,393 B1 | 8/2017 | Dunn et al. |
| 9,729,850 B2 | 8/2017 | Cole et al. |
| 2005/0162432 A1 | 7/2005 | Ballin et al. |
| 2016/0150212 A1 | 5/2016 | Moura et al. |
| 2017/0004648 A1 | 1/2017 | Li |
| 2017/0078447 A1 | 3/2017 | Hancock et al. |
| 2017/0223368 A1 | 8/2017 | Abbas et al. |
| 2017/0251204 A1 | 8/2017 | Gupte et al. |
| 2017/0280126 A1 | 9/2017 | Van der Auwera et al. |

FOREIGN PATENT DOCUMENTS

WO 2017/162479 A1 9/2017

OTHER PUBLICATIONS

International Search Report and Written Opinion dated Mar. 14, 2019, issued by the International Searching Authority in International Application No. PCT/KR2018015634 (PCT/ISA/210 and PCT/ISA/237).

*Primary Examiner* — Michelle Chin
(74) *Attorney, Agent, or Firm* — Sughrue Mion, PLLC

(57) ABSTRACT

Provided are a method and an apparatus for managing immersive data in an immersive system. The method includes: generating a truncated three-dimensional (3D) geometry including a truncated plane corresponding to a field of view (FOV) of a user, obtaining the immersive data comprising a plurality of frames based on the FOV of the user, mapping a frame from among the plurality of frames onto the truncated plane formed according to the FOV of the user, and projecting the frame onto the FOV of the user.

32 Claims, 19 Drawing Sheets

METHOD AND APPARATUS FOR MANAGING IMMERSIVE DATA

CROSS-REFERENCE TO RELATED APPLICATION(S)

This application is based on and claims priority under 35 U.S.C. § 119 to Indian Application No. 201741045031, filed on Dec. 14, 2017 in the Indian Patent Office, the disclosure of which is incorporated by reference herein in its entirety.

BACKGROUND

1. Field

The disclosure relates to content processing. More particularly, the disclosure relates to a method and system for managing immersive data in a virtual reality environment.

2. Description of Related Art

When immersive data (e.g., virtual reality (VR) video, augmented reality (AR) content, or the like) is streamed over a network, a bandwidth to transmit the immersive data using traditional methods can be as high as 20-50 times the bandwidth used by non-immersive data (e.g., non-VR video, non-AR content or the like) depending upon chosen resolutions. The non-immersive data is also referred to as flat video or normal video. The reason that so much more bandwidth is used for immersive data is that, unlike traditional single view cameras that only capture light in front of the camera, a 360-degree camera captures light from all directions and usually in a stereoscopic mode. This causes a massive increase in the number of pixels captured and corresponding data transmitted.

SUMMARY

Provided are a method, apparatus, and non-transitory computer readable medium for managing immersive data.

Additional aspects will be set forth in part in the description which follows and, in part, will be apparent from the description, or may be learned by practice of the presented embodiments.

In accordance with an aspect of the disclosure, a method for managing data in an immersive system includes: generating a truncated three-dimensional (3D) geometry including a truncated plane corresponding to a field of view (FOV) of a user; obtaining immersive data comprising a plurality of frames based on the FOV of the user; mapping a frame, from among the plurality of frames, onto the truncated plane formed according to the FOV of the user; and projecting the frame onto the FOV of the user.

In accordance with another aspect of the disclosure, an apparatus for managing immersive data includes: a memory for storing instructions; and a processor configured to execute the instructions to: generate a truncated three-dimensional (3D) geometry including a truncated plane corresponding to a field of view (FOV) of a user, obtain the immersive data comprising a plurality of frames based on the FOV of the user, map a frame, from among the plurality of frames, onto the truncated plane formed according to the FOV of the user, and project the frame onto the FOV of the user.

In accordance with another aspect of the disclosure, a non-transitory computer readable medium includes instructions thereon that, when executed, cause at least one processor to perform a method, the method including: generating a truncated three-dimensional (3D) geometry including a truncated plane corresponding to a field of view (FOV) of a user; obtaining immersive data comprising a plurality of frames based on the FOV of the user; mapping a frame, from among the plurality of frames, onto the truncated plane formed according to the FOV of the user; and projecting the frame onto the FOV of the user.

In accordance with another aspect of the disclosure, an apparatus for providing immersive data includes: a memory for storing instructions; and a processor configured to execute the instructions to: obtain the immersive data including a plurality of frames based on a field of view (FOV) of a user, and map a frame, from among the plurality of frames, onto a truncated plane formed according to the FOV of the user, the truncated frame comprised in a truncated three-dimensional (3D) geometry.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

Figure 1A:
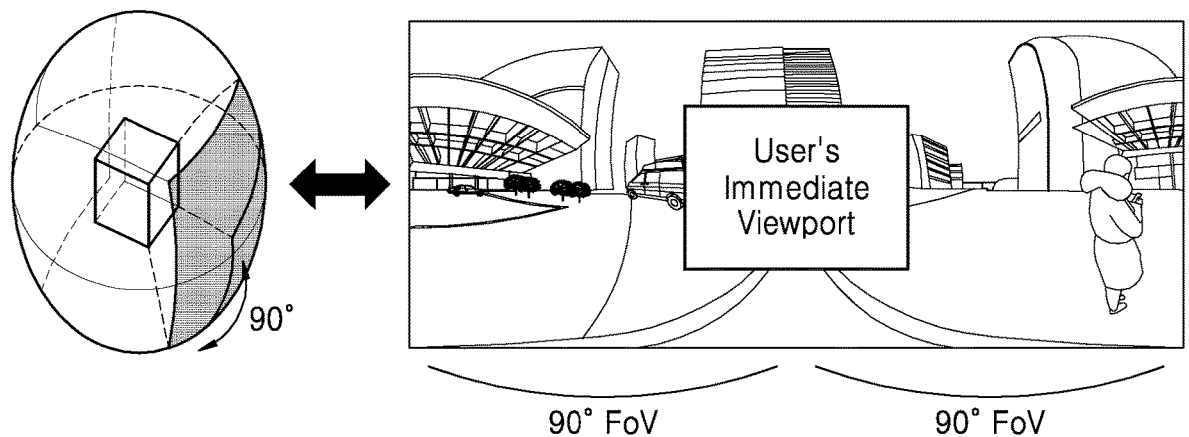
FIG. 1A illustrates streaming 360-degree virtual reality (VR) video, according to an embodiment.

The following description with reference to the accompanying drawings is provided to assist in a comprehensive understanding of various embodiments of the disclosure. The description includes various specific details to assist in that understanding, but these are to be regarded as merely exemplary. Accordingly, those of ordinary skill in the art will recognize that various changes and modifications of the various embodiments described herein may be made without departing from the scope and spirit of the disclosure.

The terms and words used in the following description and claims are merely used to enable a clear and consistent understanding of the disclosure. Accordingly, it should be apparent to those skilled in the art that the following description of various embodiments of the disclosure is provided for illustrative purposes only and not for the purpose of limiting the disclosure as defined by the appended claims and their equivalents.

As used herein, the terms "1st" or "first" and "2nd" or "second" may use corresponding components regardless of importance or order and are used to distinguish one component from another without limiting the components.

The terms "include" and "comprise," as well as derivatives thereof, mean inclusion without limitation. The term "and/or" includes a plurality of combinations of relevant items or any one item among a plurality of relevant items. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like.

Expressions such as "at least one of," when preceding a list of elements, modify the entire list of elements and do not modify the individual elements of the list. For example, the expression, "at least one of a, b, and c," should be understood as including only a, only b, only c, both a and b, both a and c, both b and c, or all of a, b, and c.

Moreover, various functions described below may be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A non-transitory computer readable medium includes media where data may be permanently stored and media where data may be stored and later overwritten, such as a rewritable optical disc or an erasable memory device.

Despite the promising nature of 360-degree virtual reality (VR) video, existing 360-degree VR video applications are still restricted to lower resolutions as compared to their two-dimensional (2D) counterparts. This is due to the challenge of efficiently transmitting 360-degree VR video streams to bandwidth-constrained devices, such as a wireless VR head-mounted display (HMD), given their high bit rate requirements.

In particular, with a 4K video resolution being widely viewed as a functional minimum resolution for current HMDs, and 8K or higher being desired, these new media are extremely bandwidth intensive and difficult to stream at acceptable quality levels. Thus, there is a balance between the requirements of streaming and the available resources on display devices, without much negative impact on the user's viewing experience. However, transmission of VR data is not suitable in a cellular network where radio resources are scarce and bandwidth is limited. Also, downloading excessive amounts of data affects electronic devices' battery life because cellular radio is known for high energy consumption. For example, when in active use, Long Term Evolution (LTE) radio is estimated to account for at least 50% of an entire smartphone's energy consumption.

The delivery and display of 360-degree video on HMDs present many technical challenges. 360-degree videos are ultra-high resolution spherical videos, which contain an omni-directional view of a scene. While the 360-degree video demands high bandwidth, at any instant of time users are only viewing a small portion of the video according to the HMD field of view (FOV).

FIG. 1A illustrates streaming 360-degree VR video according to an embodiment.

Referring to FIG. 1A, in order to reduce the bandwidth requirements, one approach is to assign a higher quality to portions of video data within an immediate viewport of a user, and a lower quality to portions that are not within the immediate viewport of the user.

For example, textures are used to provide surface wrapping for a three-dimensional (3D) object mesh, with 3D textures being a logical extension of traditional 2D textures. The 360-degree VR videos are created by mapping a raw 360-degree video as a 3D texture onto a 3D geometry mesh (e.g., a sphere), with the user at the center of that spherical geometry. In this 360-degree environment, however, the user is viewing only a small portion of the whole raw 360-degree video at any given time. Therefore, a user's FOV is only a small portion equivalent to a specific confined region on the 3D object mesh that is spatially related to the corresponding portion of the raw content.

Referring to FIG. 1A, a left subfigure shows an example 90-degree viewport as projected on a spherical 3D geometry, while the right subfigure shows how the mapping of the viewport corresponds to that of a given frame on a raw 360-degree video. Further, there is a technique of assigning higher quality to parts within the user's viewport, and lower quality to parts that are not within the immediate viewport of the user. This approach also makes it possible to stream tiles inside the viewport at a highest resolution, at or near the native resolution of the HMD.

The 360-degree video is captured in every direction from a unique point, so it is essentially a spherical video. Since related art video encoders operate on a 2D rectangular image, a key step of the encoding process is to project the spherical video onto a planar surface. It is possible to generate the viewport for any position and angle in the sphere without any information loss. The different projections are used to map data for different applications as every projection has its own level of importance and characteristics.

Figure 1B:
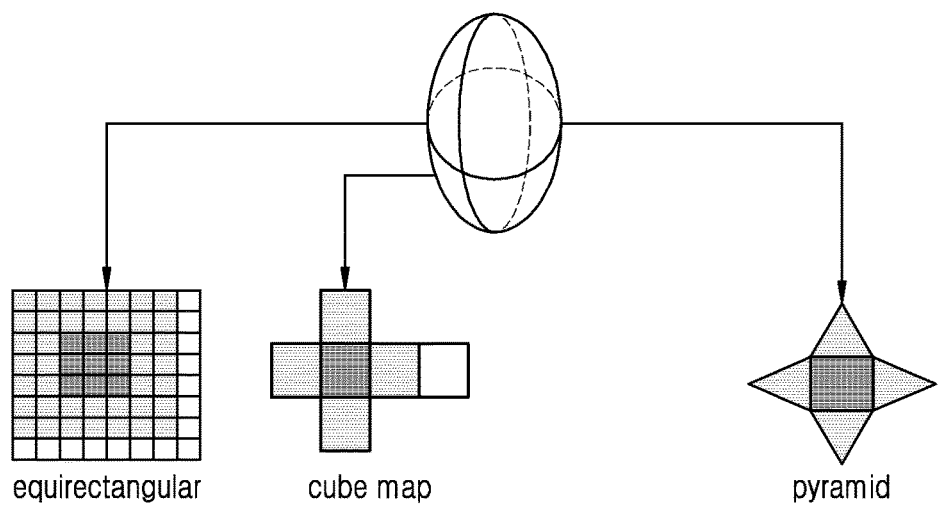
FIG. 1B illustrates a projection and distortion procedure, according to an embodiment.

FIG. 1B illustrates a projection and distortion procedure, according to an embodiment.

Overview: Projection and Distortion:

Image projection occurs whenever a flat image is mapped onto a curved surface, or vice versa, and is particularly common in a panoramic view or 3D photography. Since an entire field of view around the user can be the surface of a sphere (for all viewing angles), a similar spherical to 2D projection is utilized. This 2D image is termed a texture or environment map and the process of generating these maps is referred to as environment mapping.

Some distortion is inevitable when trying to map a spherical image onto a flat surface, i.e., the texture image.

There are four spatial properties subject to distortion in the projection, as follows:

a) Shape: If the map preserves a shape, then feature outlines (like country boundaries on a globe) look the same on the map as they actually do in reality. The map that preserves shape is called a conformal map.
b) Area: If the map preserves the area, then a size of the feature on the map is the same relative to its actual size.
c) Distance: If a line from a first point to a next point on the map is the same distance (accounting for the scale) that it actually is, then the map line has true scale.
d) Direction: Direction, or azimuth, is measured in degrees of an angle. An azimuthal projection is one that preserves direction for all straight lines passing through a single, specified point.

Each projection type generally focuses on minimizing one type of distortion at the expense of others. Related art solutions include: (a) Equirectangular; (b) Cube map; and (c) Pyramid.

Different environment mapping techniques use different geometric assumptions as well as different numbers of texture maps. The number of texture maps also affects how much the environment mapping technique distorts its environment. For example, one map for spherical environment mapping usually contains less Texel's (i.e., texture pixels) than the six maps used for cubic mapping. Therefore, a spherical map has less information to work with when representing the environment.

The assumed geometric configuration of the map can also cause distortion. However, some pixels are over-sampled (a pixel on the sphere is projected to a pair of pixels in the projected image). This is typically the case for a sphere pole when projected on the equirectangular panorama. This over-sampling degrades the performance of traditional video encoders. On the contrary, the projection onto a pyramid layout causes under-sampling. Some pairs of pixels on the sphere are merged into a single pixel in the projected image by interpolating their color values. The under-sampling causes distortion and information loss in some extracted viewports.

Figure 1C:
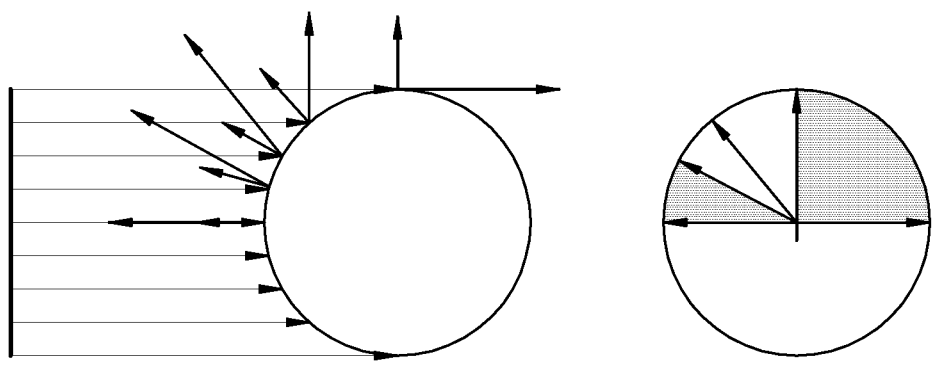
FIG. 1C illustrates a equi-rectangular/spherical projection procedure, according to an embodiment.

FIG. 1C illustrates an equirectangular/spherical projection procedure, according to an embodiment. The equirectangular/spherical projection is a latitude/longitude projection of a panoramic sphere, and may be used for exchanging spherical panoramas between applications. Since the sphere map is a circle embedded in a square, not all of the map contains useful information. In fact, 21.46% of the map is wasted, causing a waste of texture memory. The sphere mapping is a non-linear mapping technique, i.e., two points in the map are connected by an arc. However, graphics hardware uses linear interpolation to connect texture coordinates, so there may be large misrepresentation of the environment. For an eight pixel map, there is a clear difference in areas represented by the center-most pixel and a pixel near the edge.

Figure 1D:
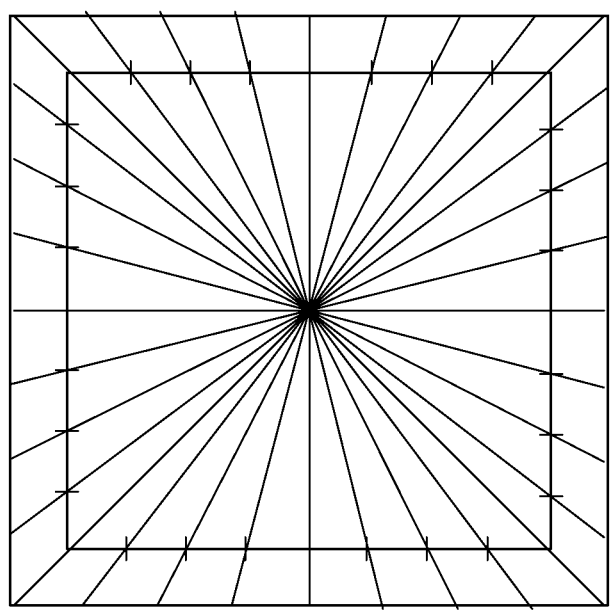
FIGS. 1D and 1E illustrate a cube map projection procedure, according to an embodiment.
Figure 1E:
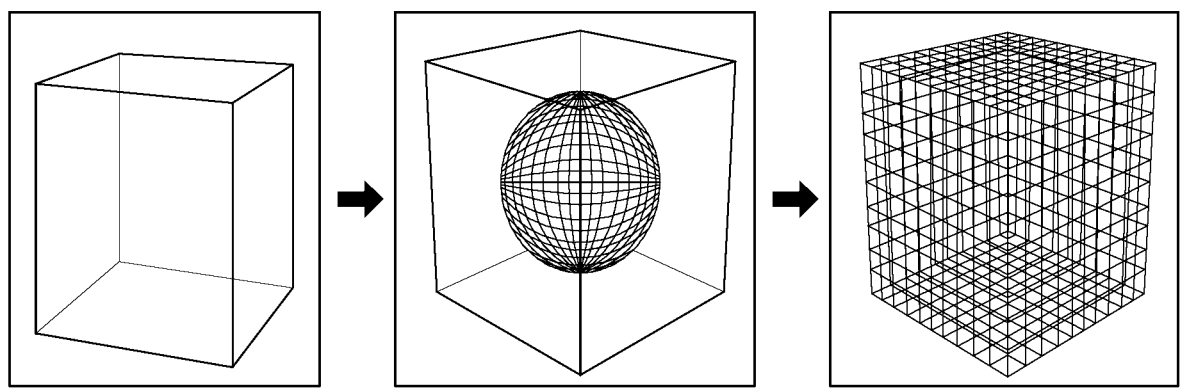

FIGS. 1D and 1E illustrate a cube map projection procedure, according to an embodiment. The cube map projection is the projection of the panoramic sphere onto a flat surface. It is the projection our eyes are used to, and is the projection of a normal camera. The cube map projection has six faces, i.e., cubic mapping. Since the mapping from the sphere to the cube is not perfect, there is still some distortion in representing the environment as the cube. Reflected vectors are interpolated linearly in hardware cube mapping. 100% of the pixels are utilized since all the environment textures are square and contain images of the environment. Similar to the sphere map, different pixels in the environment map texture subtend different angles in a cube map. For an eight pixel map, FIG. 1D shows the difference in areas represented by the center-most pixel and a pixel near the corner.

Referring to FIG. 1E, a cube mapping projection procedure maintains a sphere inside the cube, wraps an equirectangular image of a frame around the sphere, and then expands the sphere until it fills the cube.

The cube mapping projection procedure is done by transforming the top 25 percent of the video to one cube face and the bottom 25 percent to another, dividing the middle 50 percent into the four remaining cube faces, and then later aligning them in two rows. This reduces file size by 25 percent compared to the original.

Figure 1F:
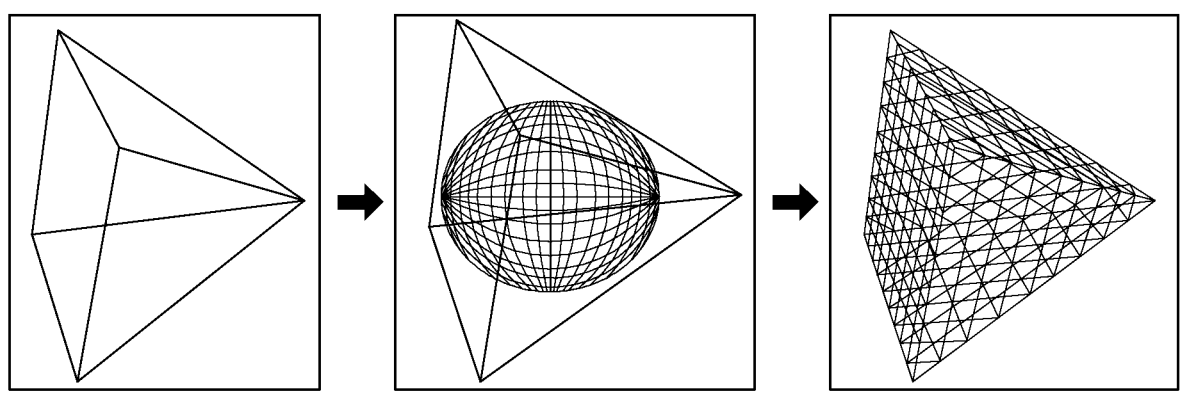
FIG. 1F illustrates a pyramid mapping projection procedure, according to an embodiment.

FIG. 1F illustrates a pyramid mapping projection procedure, according to an embodiment. In the pyramid mapping projection procedure, the spherical video is projected onto a pyramid layout from up to 30 central points to generate a set of video representations. A front face of the pyramid mapping projection has a better image quality than the other faces. Distortion is very low at the front and extremely high at the back. End users periodically select one of the representations based on their viewport center.

Referring to FIG. 1F, the pyramid mapping projection procedure maintains the sphere inside a pyramid, so that the base of the pyramid is the full-resolution FOV and the sides of the pyramid gradually decrease in quality until they reach a point directly opposite from the viewport, behind the viewer. Further, the pyramid mapping procedure unwraps the sides and stretches them slightly to fit the entire 360 images into a rectangular frame, which makes processing easier and reduces the file size by 80 percent compared to the original. Unlike in the cube maps, where every face is treated equally, in pyramids only the viewport is rendered in the full resolution. Thus, when the viewer shifts perspective, instead of looking at a different face of the pyramid, the user hops into a new pyramid. In total, there are 30 viewports covering the sphere, separated by about 30 degrees.

The pyramid mapping projection has the following characteristics: (a) High server cost, as every stream of content has 30 variants for each viewport; (b) The viewport quality may be relatively poor; and (c) Distortion is low at the front and relatively high at the back.

Figure 1G:
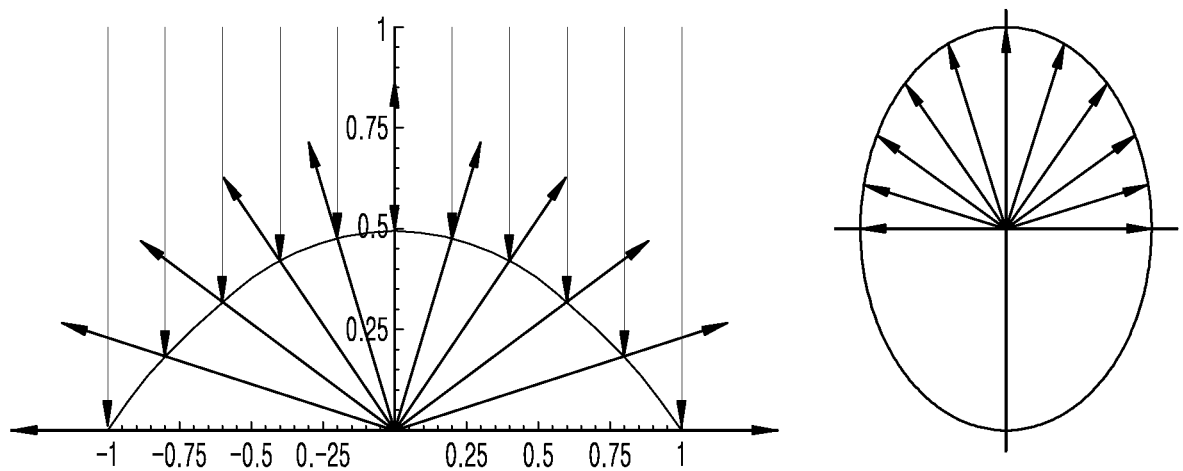
FIGS. 1G and 1H illustrate a dual paraboloid map projection procedure, according to an embodiment.
Figure 1H:
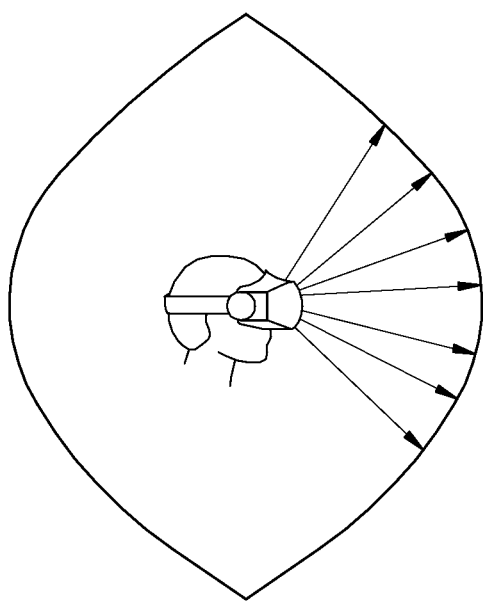

FIGS. 1G and 1H illustrate a dual paraboloid map projection procedure, according to an embodiment. The dual paraboloid map requires only two renders, each of which covers 180°. The dual paraboloid map is viewed independently. Further, the user can reuse the environment map for any given viewing direction. The paraboloid used has the equation: $x=0.75-0.75(y^2+z^2)$ with its focus at the origin. Since the paraboloid maps cover an area of a circle in the texture, the texture utilization is similar to a sphere map. Thus, 21.7% of the pixels are not used in the proper form of indexing. The distortion involved in the dual paraboloid mapping is on the order of cube mapping. The dual paraboloid map supports a nearly completely linear indexing scheme. This allows significantly increased speed with respect to hardware support. The angle subtended by 11 incoming rays on a paraboloid map is shown in FIG. 1G. The angle per pixel is greater towards the middle of the map.

Figure 1I:
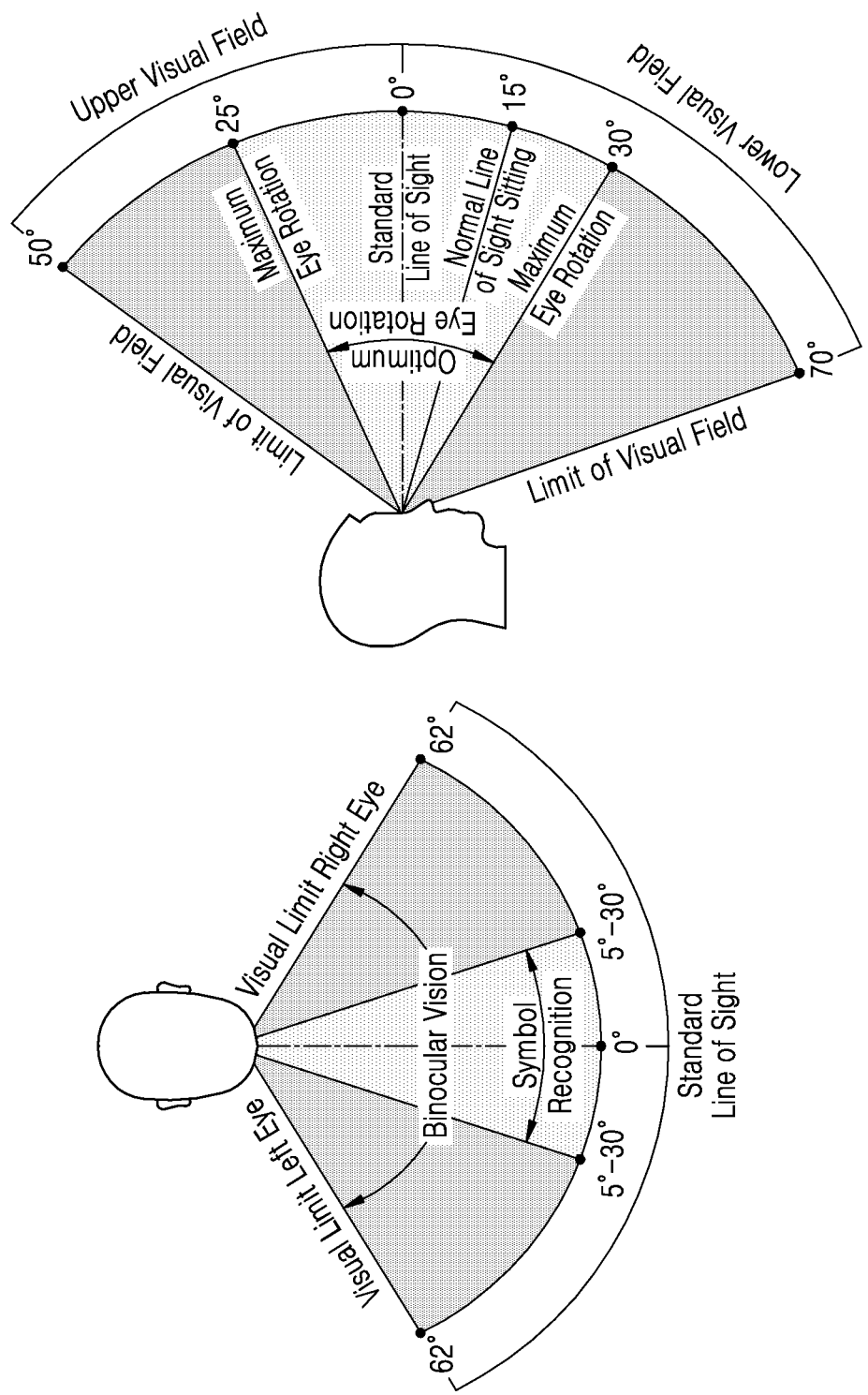
FIG. 1I illustrates a human field of view, according to an embodiment.

FIG. 1I illustrates human FOV, according to an embodiment.

In general, the horizontal range of the visual field of view (FOV) of the user (e.g., human) is typically around 135 degrees. Binocular vision, which is the basis for stereopsis and is important for depth perception, covers 114 degrees (horizontally) of the human FOV. Also, most users using 360-degree video content have minimal or rare head movement, and in most cases a user only sees 180 degrees of the 360-degree videos. Thus, to satisfy the present FOV of the user and also save bandwidth, lower resolution content in the portions of the user viewport other than the immediate FOV of the user viewport is supplied according to an embodiment.

Accordingly, one or more embodiments provide a method for managing immersive data. The method includes generating a truncated 3D geometry for projection of the immersive data based on a human stereoscopic vision. The truncated 3D geometry includes one or more truncated planes corresponding to an FOV of an immersive system.

The method according to one or more embodiments can be used to reduce a bandwidth requirement in immersive data projection (e.g., VR projection, AR projection or the like) and provides a best user experience based on human vision capability using the truncated 3D geometry, while projecting the image data.

The method according to one or more embodiments can be used to provide higher bit rate or higher resolution content to regions (e.g., truncated plane) where the user is currently looking (immediate viewport or immediate FOV) and is most likely to look, and delivers a lower quality level or lower resolution to an area outside of the user's immediate viewport as an image resolution of the remaining planes of a 3D geometry is gradually decreased based on a movement of a user of the immersive system from at least one truncated plane.

The method according to one or more embodiments can be used to reduce the amount of bandwidth required to deliver a high quality immersive experience, and increases an overall 360-degree VR video quality at a given bandwidth. The method according to one or more embodiments can be used to provide a better user experience as well as to maintain a balance between the requirements of streaming and the available resources on a display device. This results in optimizing the viewing experience of the user in a 360-degree environment.

Preferably, 360-degree content is projected on a truncated 3D surface or plane where a truncated part is considered as the user's immediate viewport and provided with the maximum possible 360-degree content quality.

The method according to one or more embodiments can be used to optimize the rendering performance of the 3D geometry (e.g., paraboloid, dual paraboloid, sphere, cuboid, cube or the like) by suggesting an environment mapping suitable for the 3D geometry. The method according to one or more embodiments provides an optimal way to create 3D geometry mapping but does not suggest anything based on a truncated viewport or optimizing the playback for a low quality connection. In the method according to one or more embodiments, the system will use a smaller number of maps, i.e., three to four maps, in comparison with cubic projection.

The distortion of the projection is very low at the principal viewing direction. The method according to one or more embodiments can be used to assign higher quality to portions within the user's immediate viewport, and use lower quality for portions that are not within the immediate viewport of the user. This is done by considering human stereoscopic vision, and results in a better user experience, effective use of bandwidth, and an improved rendering perspective of the system.

The method according to one or more embodiments can be used to provide better user experience with optimization with respect to the bandwidth, the distortion and the complexity with minimal server cost. The method according to one or more embodiments can also be used to provide adaptive streaming video playback over a network.

Referring now to the drawings, and more particularly to FIGS. 2 through 20, embodiments will be described hereinbelow.

Figure 2:
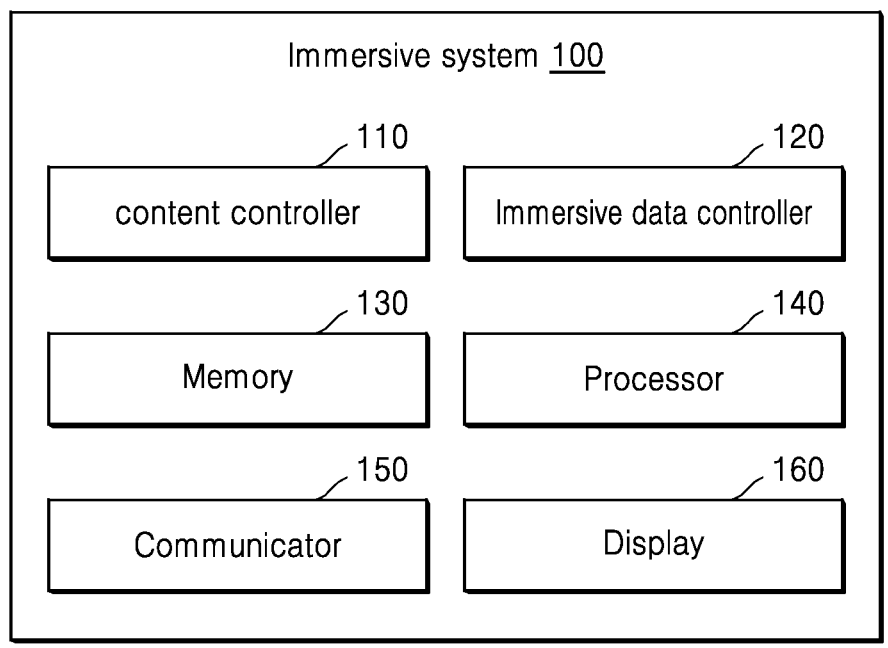
FIG. 2 illustrates a block diagram of an immersive system, according to an embodiment.

FIG. 2 is a block diagram of an immersive system 100, according to an embodiment. The immersive system 100 can be, by way of non-limiting example, a virtual reality (VR) system, an augmented reality (AR) system, a mixed VR system or the like. The immersive system 100 may include a content controller 110, an immersive data controller 120, a memory 130, a processor 140, a communicator 150 and a display 160. The content controller 110, the immersive data controller 120, the processor 140, and the communicator 150 may be implemented by using at least one hardware processor.

The content controller 110 may be configured to generate a truncated 3D geometry for projection of immersive data based on human stereoscopic vision. The truncated 3D geometry includes one or more truncated planes corresponding to an FOV of the immersive system 100. The truncated 3D geometry can be, by way of non-limiting example, a truncated paraboloid, a dual truncated paraboloid, a truncated sphere, a truncated cuboid, a truncated cube, or the like.

The FOV may be calculated based on information regarding at least one of a rotation angle of a head of a user and a direction of an eye of the user. The information of the rotation angle of the head and the direction of the eye is generally available in the form of quaternion angles, corresponding to the rotation of the head about an axis. Using the information of the rotation angle of the head and the direction of the eye, a forward vector that corresponds to a current looking direction can be determined for the immersive system 100. In general, the vector may be calculated as a unit vector.

The one or more truncated planes are formed by combining at least one face of a 3D mesh data, where the at least one truncated plane is a flat plane.

Further, the immersive data controller 120 may be configured to obtain the immersive data including a plurality of frames based on the FOV. After obtaining the immersive data including the plurality of frames, the immersive data controller 120 may map the immersive data for a frame from the plurality of frames onto at least one truncated plane of the truncated 3D geometry.

The immersive data controller 120 may be configured to prepare a plurality of versions of the frame. Each version of the plurality of versions of the frame includes different image resolutions. Further, the immersive data controller 120 may be configured to map the immersive data for a version of the plurality of versions of the frame onto at least one truncated plane of the truncated 3D geometry. The version of the frame mapped onto the at least one truncated plane may include an image resolution higher than an image resolution of remaining planes of the 3D geometry.

The image resolution of the remaining planes of the 3D geometry may be gradually decreased based on a movement of a user of the immersive system 100 from at least one truncated plane.

The immersive data controller 120 may divide the frame into a plurality of segments and detect a current viewing segment of the user of the immersive system 100 from the plurality of segments. Further, the immersive data controller 120 may be configured to map the immersive data for the current viewing segment of the user onto at least one truncated plane of the truncated 3D geometry with an image resolution higher than the image resolution mapping of remaining segments of the plurality of segments.

According to an embodiment, different connections for each of the segments of the frame are separately maintained. Furthermore, according to an embodiment, the remaining segments of the frame are mapped onto the other planes of the 3D geometry in different image resolutions.

Based on mapping the immersive data for the frame from the plurality of frames onto at least one truncated plane of the truncated 3D geometry, the immersive data controller 120 may be configured to project the frame in the FOV of the immersive system 100.

The one or more truncated planes of the truncated 3D geometry may include a minimal distortion compared to the remaining planes of the truncated 3D geometry.

The immersive data controller 120 may be configured to detect whether the FOV of the immersive system 100 is changed. Further, the immersive data controller 120 may continue to obtain the immersive data and map the immersive data onto the at least one truncated plane of the truncated 3D geometry in response to detecting that the FOV of the immersive system 100 is not changed. Conversely, the immersive data controller 120 may dynamically regenerate the truncated 3D geometry based on the changed FOV in response to detecting that the FOV of the immersive system 100 is changed.

The immersive data controller 120 may be configured to obtain the immersive data including the plurality of frames corresponding to a 3D geometry. The 3D geometry can be, by way of non-limiting example, a paraboloid, a dual paraboloid, a sphere, a cuboid, a cube, or the like.

As described above, the immersive data controller 120 is configured to detect the FOV of the immersive system 100. Based on the FOV of the immersive system 100, the immersive data controller 120 is configured to dynamically truncate one or more planes of the 3D geometry.

According to an embodiment, the at least one plane of the 3D geometry is dynamically truncated based on human stereoscopic vision.

After truncating one or more planes of the 3D geometry, the immersive data controller 120 is configured to project the immersive data in the frame from the plurality of frames by mapping the immersive data to the at least one truncated plane of the 3D geometry.

According to an embodiment, the at least one truncated plane of the 3D geometry is a flat plane. The truncated plane of the 3D geometry may include a minimal distortion compared to the remaining planes of the 3D geometry.

Furthermore, based on a detected change in the FOV, the immersive data controller 120 may dynamically truncate the 3D geometry.

The immersive data controller 120 may be configured to prepare the plurality of versions of the frame. Each version of the plurality of versions of the frame includes a different image resolution. Further, the immersive data controller 120 is configured to map the immersive data for the version of the plurality of versions of the frame onto the at least one truncated plane of the 3D geometry. The version of the frame mapped onto the at least one truncated plane includes an image resolution higher than the image resolution of the remaining planes of the 3D geometry. Further, the immersive data controller 120 is configured to project the mapped version of the frame in the FOV of the immersive system 100.

According to an embodiment, the image resolution of the remaining planes of the 3D geometry gradually decreases based on a movement of a user of the immersive system 100 from at least one truncated plane.

As described above, according to an embodiment, the immersive data controller 120 is configured to divide the frame into the plurality of segments and detect the current viewing segment of the user of the immersive system 100 from the plurality of segments. After detecting the current viewing segment of the user of the immersive system 100 from the plurality of segments, the immersive data controller 120 is configured to map the immersive data for the current viewing segment of the user onto the at least one truncated plane of the 3D geometry with the image resolution higher than the image resolution mapping of the remaining segments of the plurality of segments. Based on the mapping, the immersive data controller 120 is configured to project the frame in the FOV of the immersive system 100. The remaining segments of the frame may be mapped onto the at least one truncated plane of the 3D geometry in different image resolutions.

According to an embodiment, the truncation can be decided based on the user's present FOV or the FOV provided by a device. The truncation part will move as the user changes his/her FOV while watching content.

The number of truncations in the content can be decided based on the type of content. For example, for 180-degree viewing range content where the user is not moving at all, a center part of the 180-degree viewing range content can be truncated or may need only one truncation. Meanwhile, in 360-degree viewing range content, the number of truncations could be two or more depending upon the FOV, user movement, and characteristics of the content. The above-noted 180-degree viewing range content may include, but is not limited to, 180-degree viewing range video content, substantially 180-degree viewing range content, or content with a viewing range lower than 180 degrees. Likewise, the above-noted 360-degree viewing range content may include, but is not limited to, 360-degree viewing range video content, substantially 360-degree viewing range content, or content with a viewing range lower than 360 degrees.

According to an embodiment, in FOV prediction, the immersive system 100 predicts in which direction the user is more likely to move while watching the content (e.g., 180-degree content, 360-degree content or the like). An FOV prediction algorithm can be used in advance to determine a spatial part of the content or texture to be truncated, depending on whether the content can be prepared as a result of the truncation part being read at a server side by the time the user's FOV actually moves in that direction.

The processor 140 may be configured to execute instructions stored in the memory 130 and to perform various processes. The communicator 150 is configured to communicate internally between internal hardware components and with external devices via one or more networks. The communicator 150 may be configured to communicate with the content controller 110 and the immersive data controller 120 to manage the immersive data projection in the immersive system 100. The display 160 may be controlled to display the immersive data.

The memory 130 stores truncated 3D geometry information and the immersive data. The memory 130 may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory 130 may, in some examples, be considered a non-transitory storage medium. The term "non-transitory" may indicate that the storage medium is not embodied in a carrier wave or a propagated signal. However, the term "non-transitory" should not be interpreted to mean that the memory 130 is non-movable. In certain examples, a non-transitory storage medium may store data that can, over time, change (e.g., in Random Access Memory (RAM) or cache).

Although FIG. 2 illustrates various hardware components of the immersive system 100, it is to be understood that other embodiments are not limited thereto. For example, in other embodiments, the immersive system 100 may include more or less components. Further, the labels or names of the components are used only for illustrative purposes and do not limit the scope of the present inventive concept(s). One or more components can be combined together to perform the same or substantially similar function to manage the immersive data in the immersive system 100.

Figure 3:
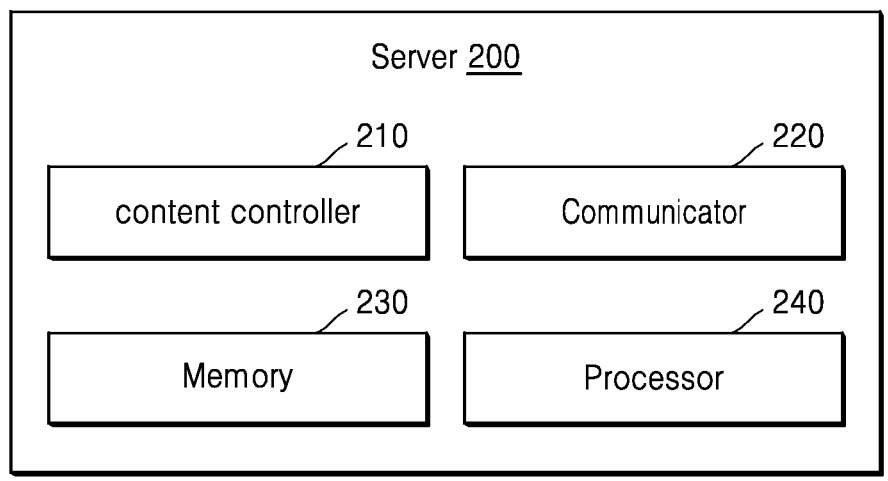
FIG. 3 illustrates a block diagram of a server, according to an embodiment.

FIG. 3 is a block diagram of a server 200, according to an embodiment. The server 200 may include a content controller 210, a communicator 220, a memory 230, and a processor 240. The content controller 210 communicates with the memory 230 and the processor 240. The content controller 210 may be configured to obtain at least one FOV from an immersive client. Based on the at least one FOV of the immersive client, the content controller 210 may be configured to dynamically truncate at least one plane of the 3D geometry. Further, the content controller 210 may be configured to generate at least one immersive data in the frame from the plurality of frames by mapping the at least one immersive data to the at least one truncated plane of the 3D geometry. In one or more embodiments, the content controller 210, the communicator 220, and/or the processor 240 can be implemented by using at least one hardware processor.

Further, the content controller 210 may be configured to send the frame to be projected on the FOV of the immersive client.

According to an embodiment, the content controller 210 is configured to generate a plurality of versions of the frame. Each of the plurality of versions of the frame comprises a different image resolution. After generating the plurality of versions of the frame, the content controller 210 is configured to map the immersive data for a version of the plurality of versions of the frame onto the at least one truncated plane of the 3D geometry. The version of the frame mapped onto the at least one truncated plane includes an image resolution higher than the image resolution of the remaining planes of the 3D geometry.

Further, the content controller 210 may be configured to detect a change in the FOV. The content controller 210 is configured to dynamically project the generated immersive data from the at least one generated immersive data based on the change in the FOV.

The projection of the immersive data can be either done using a closed system between the user and the server 200 (e.g., media content server), where the FOV information is sent to the server 200 and the server 200 will supply the projected truncated content accordingly.

According to an embodiment, the server 200 may generate the multiple content for different FOVs where a different spatial part of the 360-degree videos are truncated and all options will be supplied to the immersive client via, for example, a media playlist and the immersive client can request the specific content based on the present FOV.

According to an embodiment, the particular scene can be analyzed at the server 200 and key spatial components are found in the video scene that matters the most in the video content based on an effective truncation area being selected. In an example, a Gravitational view-prediction procedure uses physics and heat maps to better predict where to next deliver the highest concentration of pixels. Also, an Artificial intelligence (AI) model can intuitively select the most interesting parts of the video to support prediction for streaming to the VR and non-VR devices in the absence of heat map data. Thus, the server 200 can acknowledge interesting parts and then truncation of projection can be applied for the corresponding spatial part of the projection.

The processor 240 may be configured to execute instructions stored in the memory 230 and to perform various processes. The communicator 220 may be configured to communicate internally between internal hardware components and with external devices via one or more networks. The communicator 220 may be configured to communicate with the content controller 210 to manage the immersive data.

The memory 230 stores the immersive data and the plurality of versions of the frame. The memory 230 also stores instructions to be executed by the processor 240. The memory 230 may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory 230 may, in some examples, be considered a non-transitory storage medium. The term "non-transitory" may indicate that the storage medium is not embodied in a carrier wave or a propagated signal. However, the term "non-transitory" should not be interpreted as meaning that the memory 230 is non-movable. In some examples, the memory 230 can be configured to store larger amounts of information than the memory. In certain examples, a non-transitory storage medium may store data that can, over time, change (e.g., in Random Access Memory (RAM) or cache).

Although FIG. 3 illustrates various hardware components of the server 200, it should be understood that other embodiments are not limited thereto. For example, in one or more other embodiments, the server 200 may include more or less components. Further, the labels or names of the components are used only for illustrative purposes and do not limit the scope of the present inventive concept(s). One or more components can be combined together to perform the same or substantially similar function to manage the immersive data.

Figure 4:
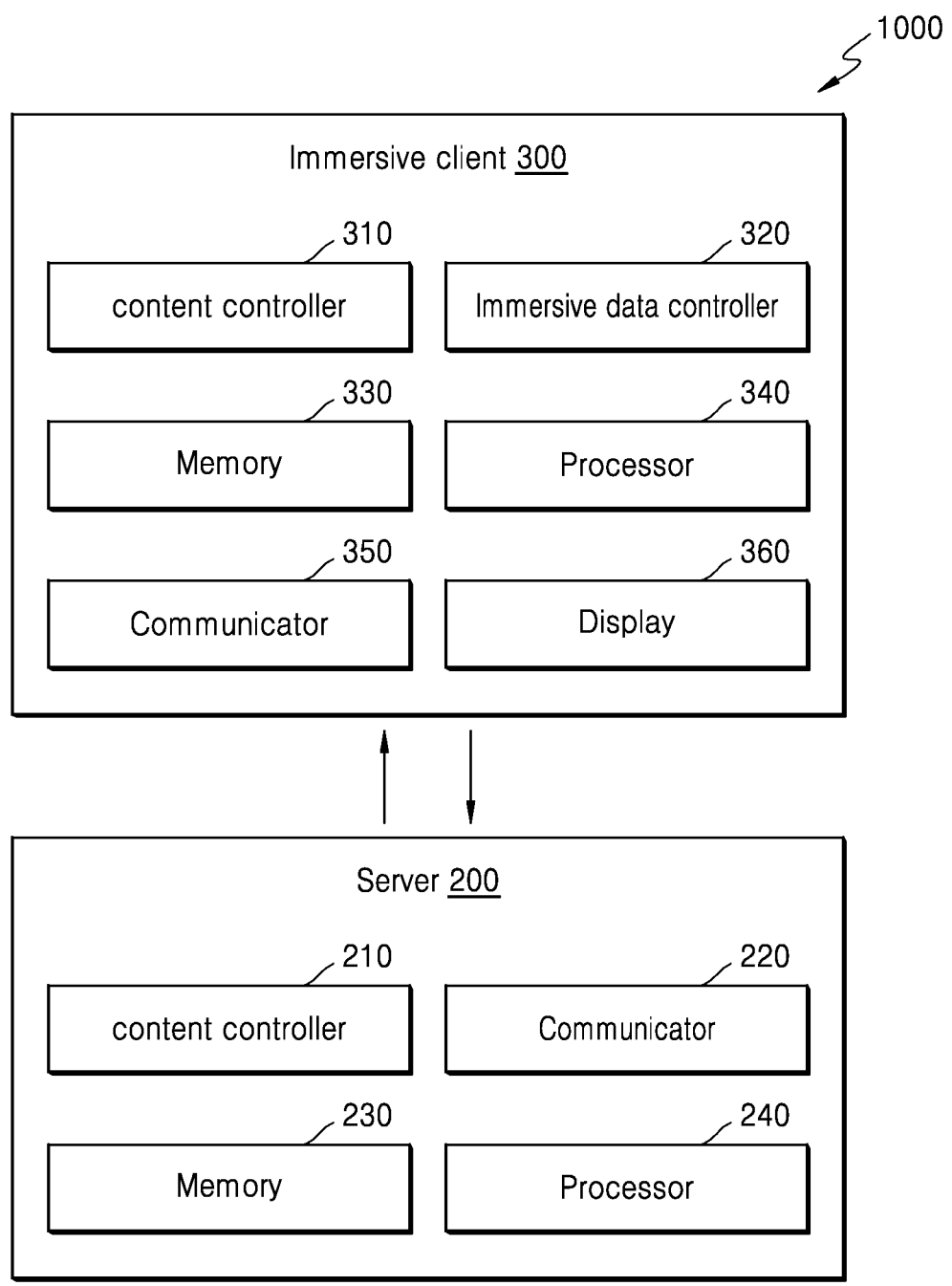
FIG. 4 illustrates an overview of a system for managing immersive data, according to an embodiment.

FIG. 4 illustrates an overview of a system 1000 for managing the immersive data, according to an embodiment. Referring to FIG. 4, the system 1000 may include the immersive client 300 and the server 200. The immersive client 300 can be, but is not limited to, a cellular phone, a smart phone, a personal digital assistant (PDA), a tablet computer, a laptop computer, an HMD device, smart glasses, or the like.

The immersive client 300 may include a content controller 310, an immersive data controller 320, a memory 330, a processor 340, a communicator 350, and a display 360. The operations and functions of the content controller 310, the immersive data controller 320, the memory 330, the processor 340, the communicator 350, and the display 360 are the same as or similar to the operations and functions described above in connection with the content controller 110, the immersive data controller 120, the memory 130, the processor 140, the communicator 150, and the display 160, respectively, as shown in FIG. 2. Likewise, the operations and functions of the server 200 are the same as or similar to those described above with reference to FIG. 3.

Further, the truncation can be decided based on a user's present FOV or the FOV provided by a device. A truncation part or portion will move as the user changes his/her FOV while watching the content.

In an embodiment, virtual reality (VR) videos are created by mapping a raw video as a 3D texture onto a 3D geometry mesh. In the case of streaming, adaptive playback textures are supplied by the server 200 as per the request of the immersive client 300, and the immersive client 300 may request a particular media streaming depending upon the available bandwidth.

As the 360-degree video playback uses the 3D geometry mesh at the immersive client 300, the mesh details can be available to the immersive client 300 in at least one of the following ways (although it is understood that one or more other embodiments are not limited thereto):
a) Hardcoded 3D geometry mesh at the immersive client 300: In this case, the 3D mesh information is hardcoded or pre-stored at the immersive client 300 in advance and the immersive client 300 simply obtains or receives the stream from the server 200 and maps the stream to the 3D mesh.
b) The 3D geometry mesh is streamed to the immersive client 300 in a separate connection: In this case, one connection is made to fetch 3D mesh information from the sever 300 and another for the media streams (Texture).
c) 3D geometry mesh as a track in the media stream: In this case, the 3D mesh information is a part of a media stream itself, e.g., as a different track.

In an embodiment, the server 200 may obtain the FOV input from the immersive client 300. The server 200 may obtain quaternion input from an HMD and convert the quaternion input to a unit vector. The server 200 may generate new vectors by rotating the current vector by an angle of FOV/2 in both clockwise and counter clockwise directions. The server 200 may find or determine the intersection point of these vectors with the projection geometry. The server 200 may find or determine an equation of a truncated plane using the above points and the normal vector. The equation and corresponding calculation according to an embodiment are explained in further detail below. The server 200 may apply the desired projection geometry and use the truncated plane equation to find the correct remapping of the existing data, in such a way that all points exceeding the specified threshold are mapped to the plane. The server 200 may send the above remapped data to the client 300. The client 300 may apply the remapped textures on the required or utilized mesh for the display on the display device 360.

According to another embodiment, the server 200 may obtain the FOV input from the immersive client 300. The server 200 applies the desired projection geometry and utilizes a predefined truncated plane equation to find the correct remapping of the existing data, in such a way that all points exceeding the specified threshold are mapped to the plane. Based on the mapping, the server 200 may rotate the truncated plane by a predefined amount to obtain the plane in a new looking or viewing direction. The server 200 may utilize the equation to obtain multiple streams based on different viewing angles. The server 200 may store the streams along with their corresponding viewing angles. The server 200 may update the media playlist streams with FOV information and store the updated media playlist streams and/or the FOV information at a specific location.

The server 200 establishes the connection with the immersive client 300. The server 200 receives the media playlist from the client 300 based on the connection. The client 300 receives a media playlist with all variants of stream information. The client 300 calculates the present FOV direction to select a stream from the media playlist and requests a specific media stream accordingly. The server 200 receives a request from the client and locates the requested media stream and/or a stored variant of the requested media stream. The server 200 sends the located media stream to the client 300, and the client 300 applies the remapped textures on the required or utilized mesh for display.

Although FIG. 4 illustrates various hardware components of the system 1000, it is to be understood that one or more other embodiments are not limited thereto. For example, in one or more other embodiments, the system 1000 may include more or less components. Further, the labels or names of the components are used only for illustrative purposes and do not limit the scope of the present inventive concept(s). One or more components can be combined together to perform the same or substantially similar function to manage the immersive data.

Figure 5A:
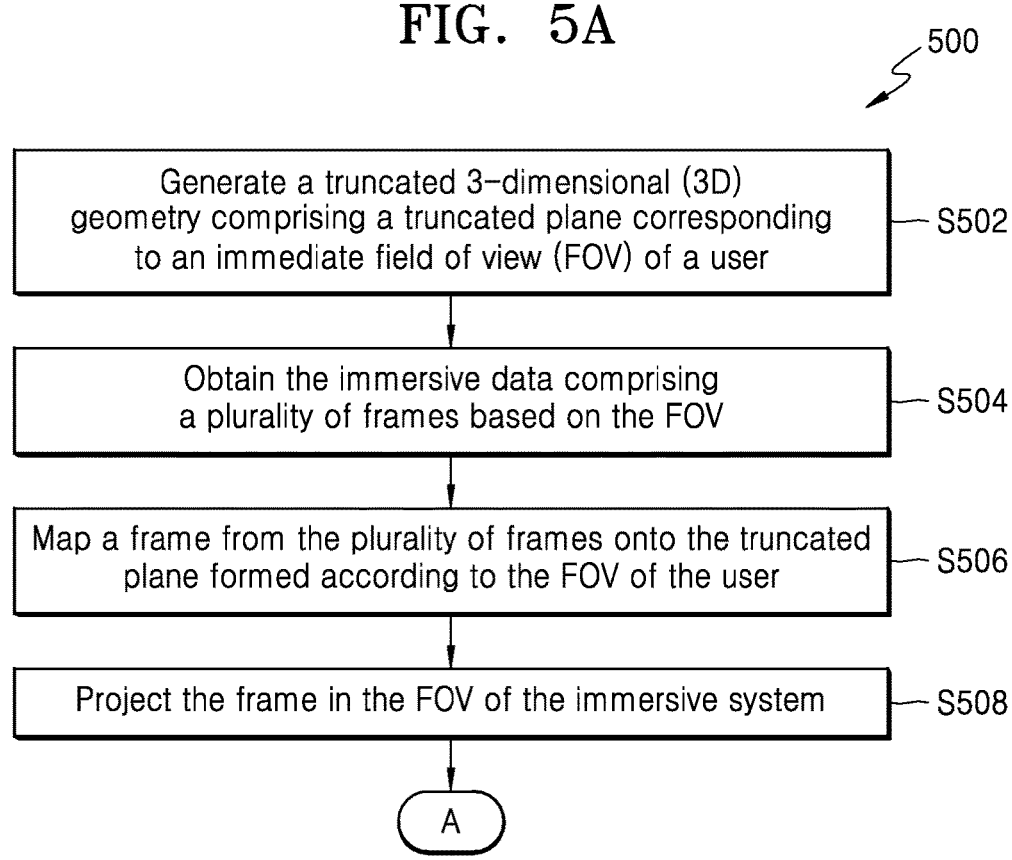
FIGS. 5A and 5B are flowcharts illustrating various operations for managing immersive data by generating a truncated 3D geometry, according to an embodiment.

FIG. 5A is a flowchart 500 illustrating various operations for managing immersive data by generating a truncated 3D geometry, according to an embodiment.

Referring to FIG. 5A, in operation S502, the content controller 110 generates the truncated 3D geometry for projection of the immersive data based on human stereoscopic vision. The 3D geometry may include at least one truncated plane that corresponds to an immediate FOV of a user.

In operation S504, the immersive data controller 120 obtains the immersive data including a plurality of frames based on the FOV.

In operation S506, the immersive data controller 120 maps the immersive data for a frame from among the plurality of frames onto at least one truncated plane of the truncated 3D geometry according to the FOV of the user.

In operation S508, the immersive data controller 120 projects the frame in the FOV of the immersive system 100.

Figure 5B:
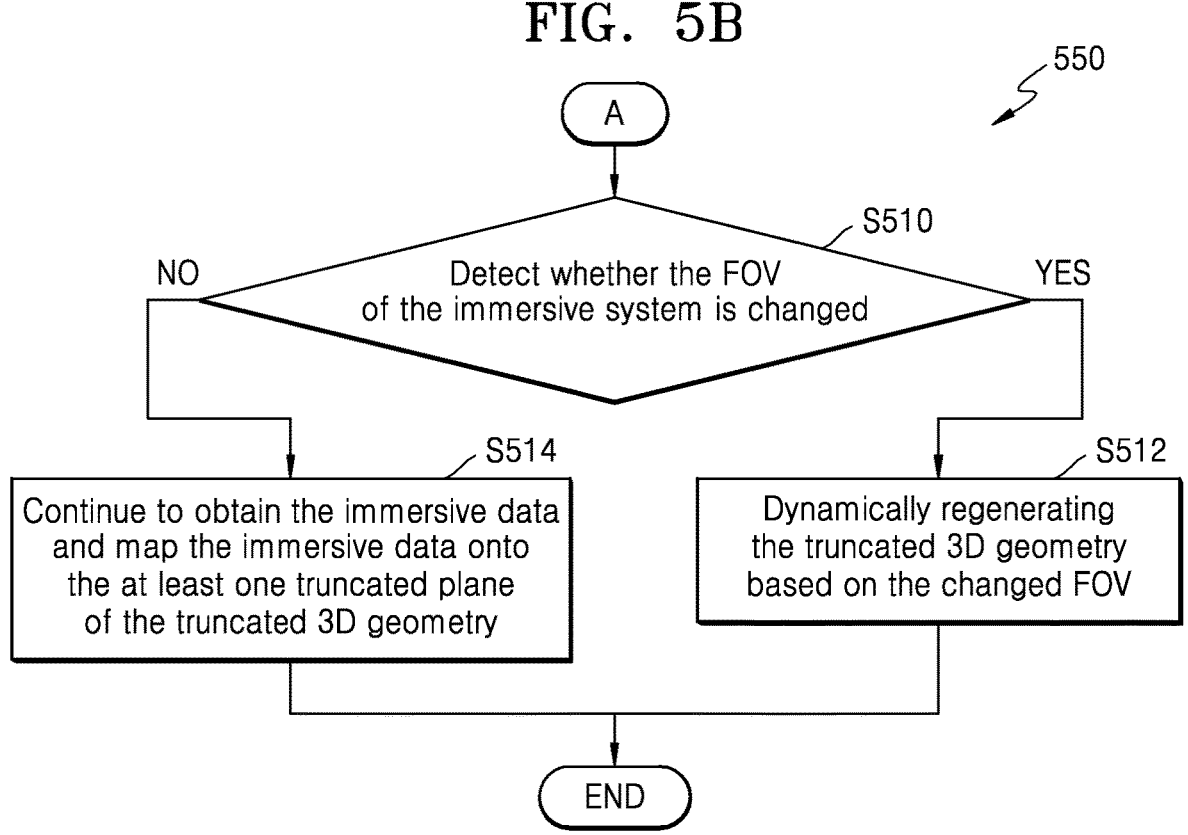

FIG. 5B is a flowchart 550 illustrating various operations for managing immersive data by generating a truncated 3D geometry, according to an embodiment.

Referring to FIG. 5B, in operation S510, the immersive data controller 120 detects whether the FOV of the immersive system 100 is changed.

If the FOV of the immersive system 100 is not changed then, in operation S514, the immersive data controller 120 continues to obtain the immersive data and maps the immersive data onto the at least one truncated plane of the truncated 3D geometry.

If the FOV of the immersive system 100 is changed then, in operation S512, the immersive data controller 120 dynamically regenerates the truncated 3D geometry based on the changed FOV.

The proposed method can be used to provide support for a dynamic change in projection when needed, so any change in the projection and texture stream can be realized easily.

The various actions, acts, blocks, operations, or the like in the flowcharts 500 and 550 may be performed in the order presented, in a different order, or simultaneously. Further, in one or more embodiments, some of the actions, acts, blocks, operations, or the like may be omitted, added, modified, skipped, or the like without departing from the scope of the disclosure.

Figure 6:
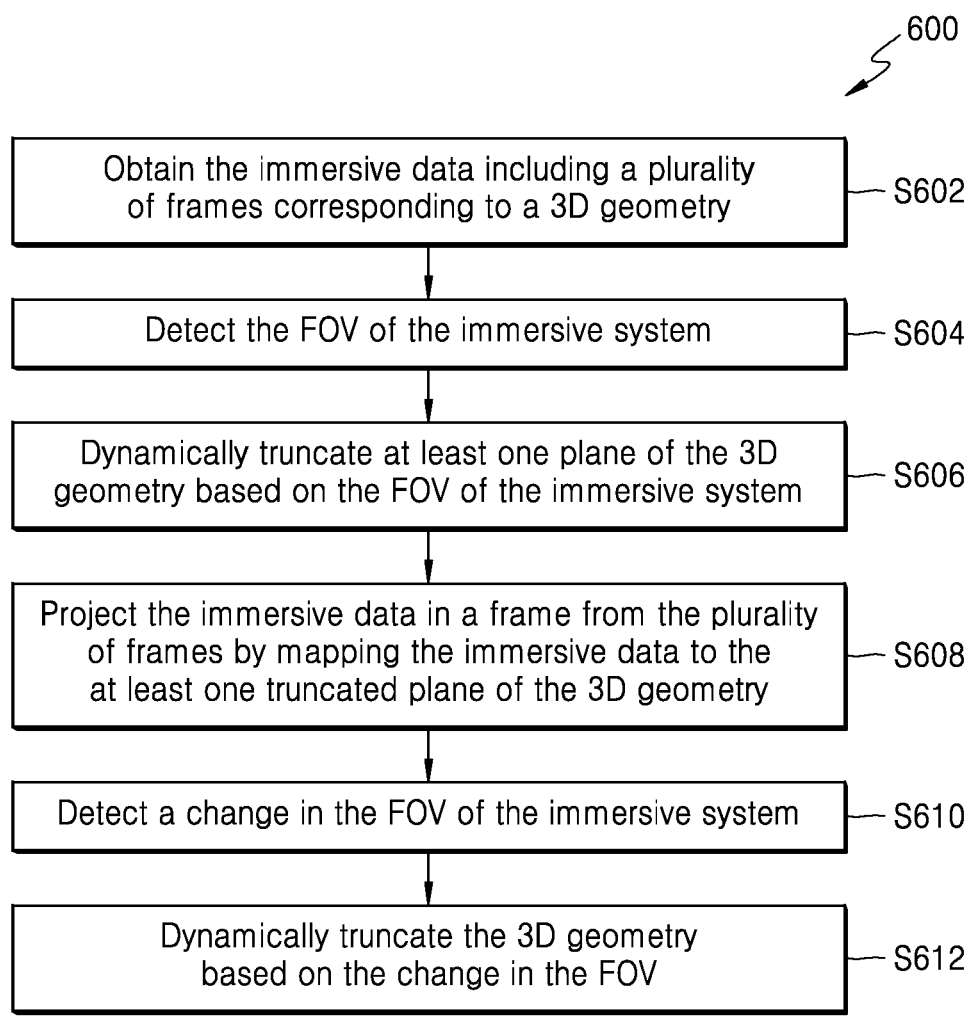
FIG. 6 is a flowchart illustrating various operations for managing immersive data by mapping the immersive data to one or more truncated planes of a 3D geometry, according to an embodiment.

FIG. 6 is a flowchart 600 illustrating various operations for managing immersive data by mapping the immersive data to one or more truncated planes of a 3D geometry, according to an embodiment. The operations (i.e., S602 to S612) can be performed by the immersive data controller 120 and/or the processor 140.

Referring to FIG. 6, in operation S602, the method includes obtaining the immersive data including the plurality of frames corresponding to the 3D geometry. In operation S604, the method includes detecting the FOV of the immersive system 100. In operation S606, the method includes dynamically truncating at least one plane of the 3D geometry based on the FOV of the immersive system 100. In operation S608, the method includes projecting the immersive data in the frame from the plurality of frames by mapping the immersive data to the at least one truncated plane of the 3D geometry. In operation S610, the method includes detecting the change in the FOV of the immersive system 100. In operation S612, the method includes dynamically truncating the 3D geometry based on the detected change in the FOV.

The various actions, acts, blocks, operations, or the like in the flowchart 600 may be performed in the order presented, in a different order, or simultaneously. Further, in one or more embodiments, some of the actions, acts, blocks, operations, or the like may be omitted, added, modified, skipped, or the like without departing from the scope of the disclosure.

Figure 7:
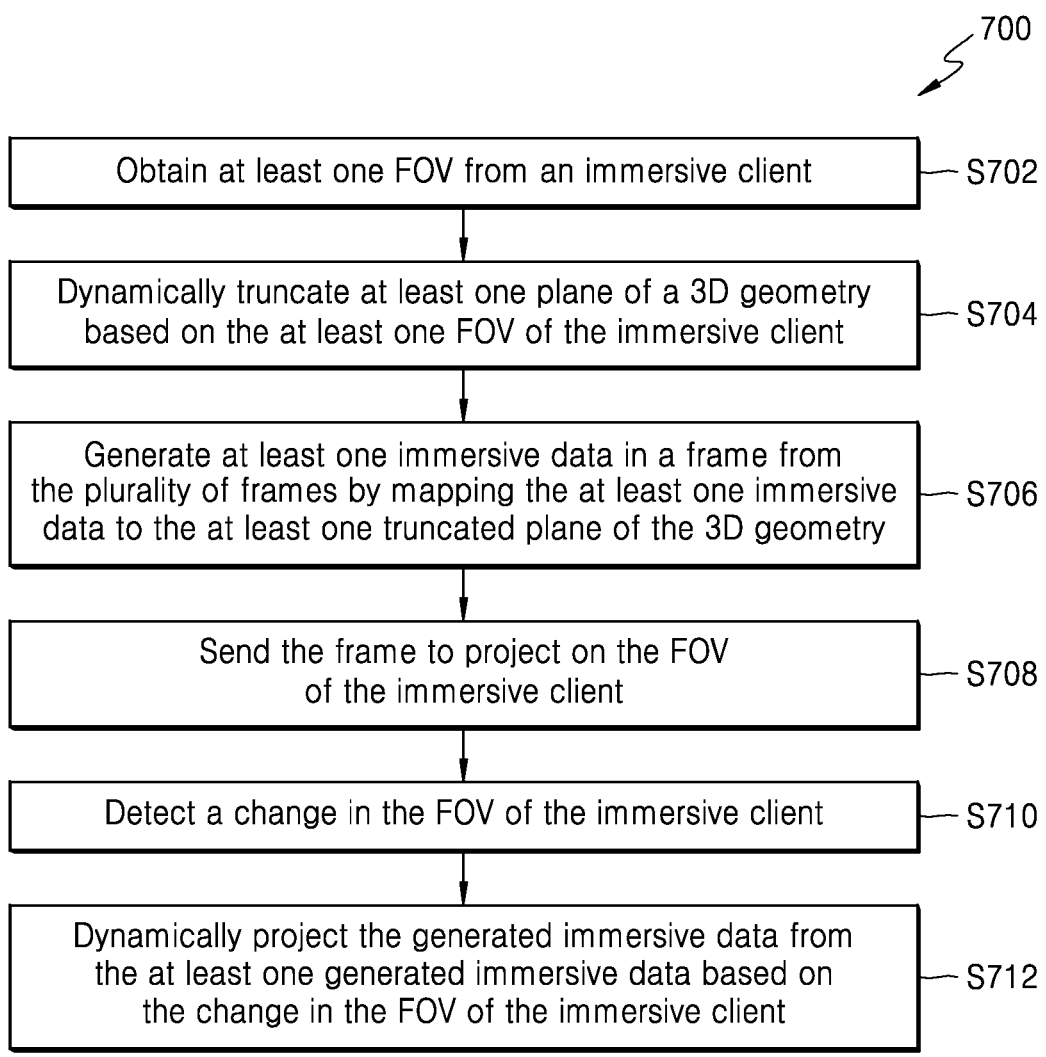
FIG. 7 is a flowchart illustrating various operations for managing immersive data, when a server sends a frame to be projected on a field of view (FOV) of an immersive client, according to an embodiment.

FIG. 7 is a flowchart 700 illustrating various operations for managing immersive data, when the server 200 sends a frame to be projected on the FOV of the immersive client 300, according to an embodiment. The operations (i.e., S702 to S712) can be performed by the content controller 310 and/or the processor 340.

Referring to FIG. 7, in operation S702, the method includes obtaining at least one FOV from the immersive client 300. In operation S704, the method includes dynamically truncating at least one plane of the 3D geometry based on the at least one FOV of the immersive client 300. In operation S706, the method includes generating the at least one immersive data in a frame from a plurality of frames by mapping the at least one immersive data to the at least one truncated plane of the 3D geometry. In operation S708, the method includes sending the frame to be projected on the FOV of the immersive client 300. In operation S710, the method includes detecting the change in the FOV of the immersive client 300. In operation S712, the method includes dynamically projecting the generated immersive data from the at least one generated immersive data based on the change in the FOV of the immersive client 300.

The various actions, acts, blocks, operations, or the like in the flowchart 700 may be performed in the order presented, in a different order, or simultaneously. Further, in one or more embodiments, some of the actions, acts, blocks, operations, or the like may be omitted, added, modified, skipped, or the like without departing from the scope of the disclosure.

Figure 8:
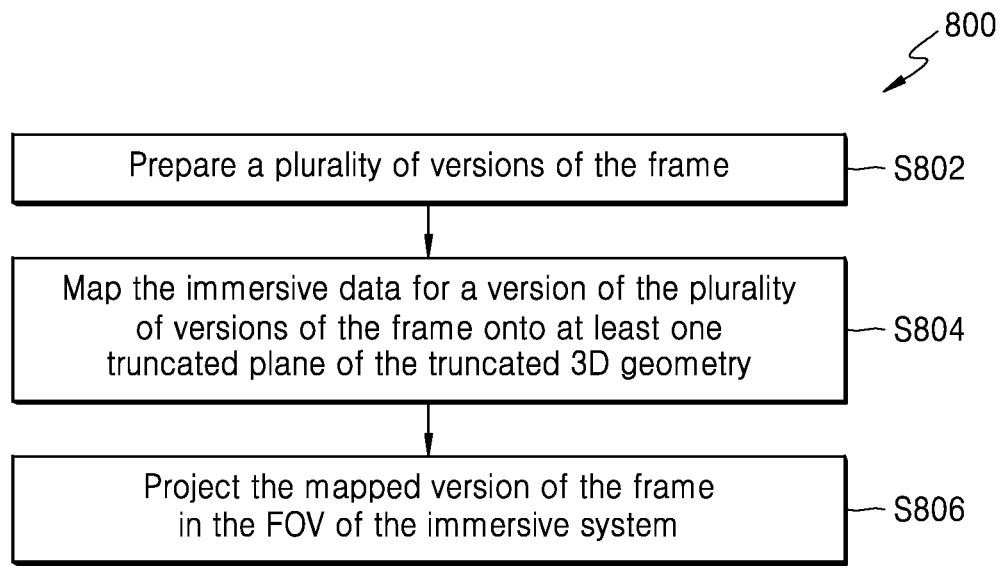
FIG. 8 is a flowchart illustrating various operations for projecting a mapped version of a frame in the FOV of an immersive system based on viewport based immersive data, according to an embodiment.

FIG. 8 is a flowchart 800 illustrating various operations for projecting a mapped version of a frame in an FOV of the immersive system 100 based on viewport based immersive data, according to an embodiment. The operations (i.e., S802 to S806) can be performed by the immersive data controller 120 and/or the processor 140.

Referring to FIG. 8, in operation S802, the method includes preparing a plurality of versions of the frame. In operation S804, the method includes mapping the immersive data for one of the plurality of versions of the frame onto at least one truncated plane of the truncated 3D geometry. In operation S806, the method includes projecting the mapped version of the frame in the FOV of the immersive system 100.

The various actions, acts, blocks, operations, or the like in the flowchart 800 may be performed in the order presented, in a different order, or simultaneously. Further, in one or more embodiments, some of the actions, acts, blocks, operations, or the like may be omitted, added, modified, skipped, or the like without departing from the scope of the disclosure.

Figure 9:
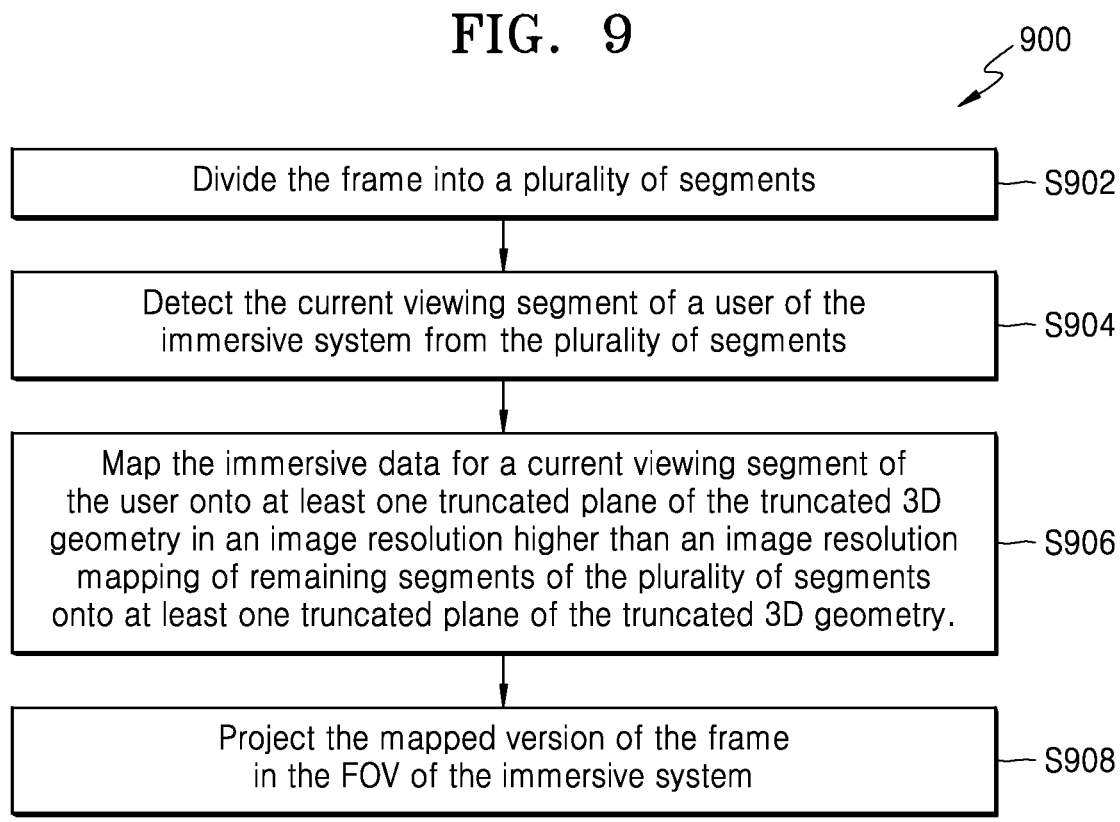
FIG. 9 is a flowchart illustrating various operations for projecting a mapped version of a frame in the FOV of an immersive system based on a number of textures, according to an embodiment.

FIG. 9 is a flowchart 900 illustrating various operations for projecting a mapped version of a frame in an FOV of the immersive system 100 based on a number of textures, according to an embodiment. The operations (i.e., S902 to S908) are performed by the immersive data controller 120 and/or the processor 140.

Referring to FIG. 9, i operation S902, the method includes dividing the frame into a plurality of segments. In operation S904, the method includes detecting a current viewing segment being viewed by the user of the immersive system 100 from among the plurality of segments. In operation S906, the method includes mapping the immersive data for the current viewing segment of the user onto at least one truncated plane of the truncated 3D geometry in an image resolution higher than the image resolution mapping of remaining segments of the plurality of segments onto at least one truncated plane of the truncated 3D geometry. In operation S908, the method includes projecting the mapped version of the frame in the FOV of the immersive system 100.

The various actions, acts, blocks, operations, or the like in the flowchart 900 may be performed in the order presented, in a different order, or simultaneously. Further, in one or more embodiments, some of the actions, acts, blocks, operations, or the like may be omitted, added, modified, skipped, or the like without departing from the scope of the disclosure.

Figure 10A:
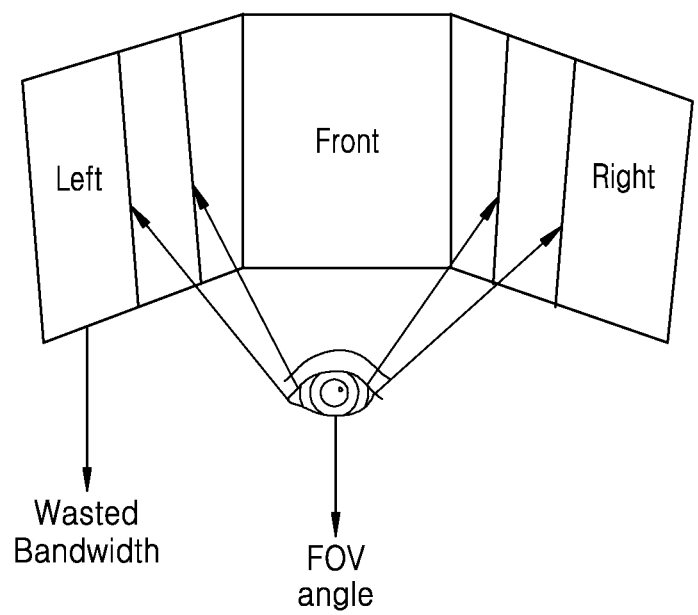
FIGS. 10A and 10B illustrate immersive data projected based on an FOV, according to an embodiment.
Figure 10B:
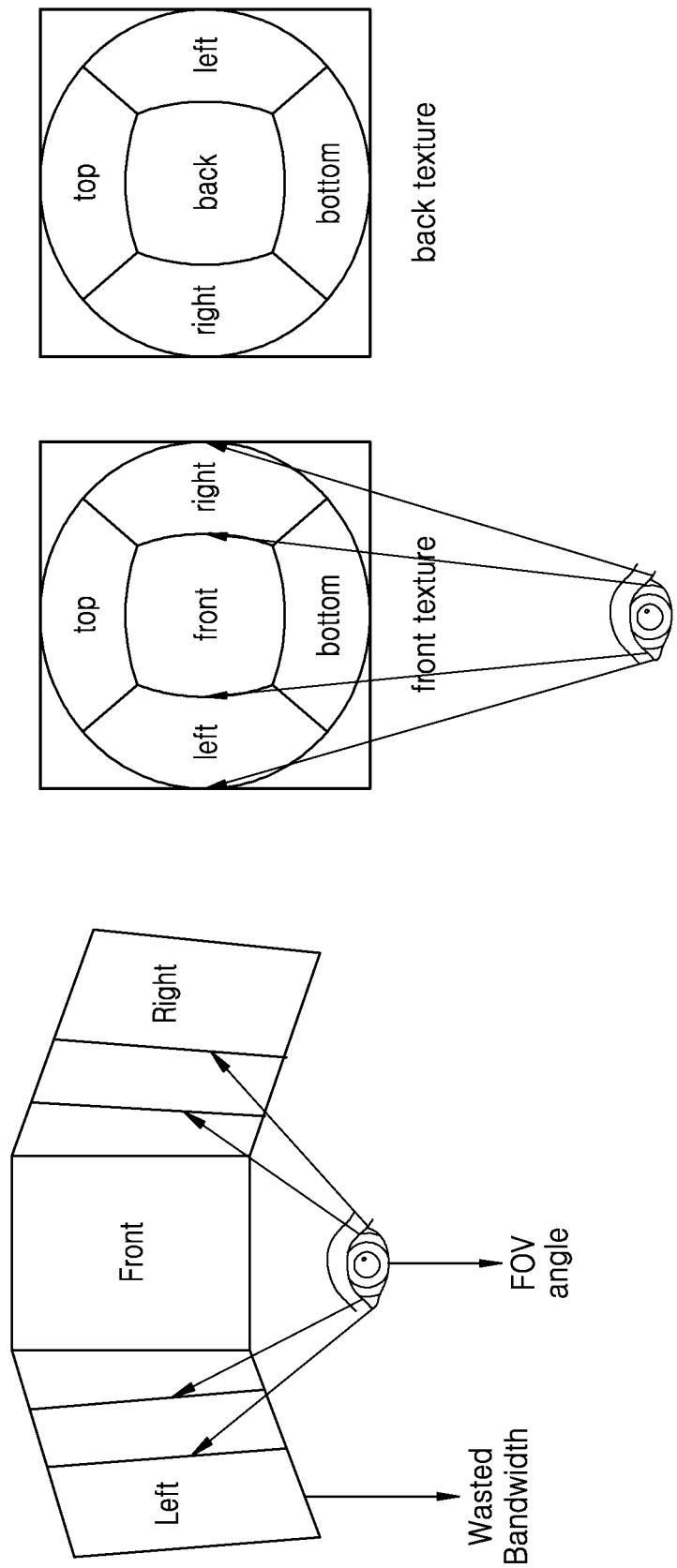

FIGS. 10A and 10B illustrate immersive data being projected based on the FOV, according to one or more embodiments. Referring to FIG. 10A, as the FOV increases, at least three faces are assigned with a higher bandwidth value.

Typically, as the projection is based on the cube projection, six different textures are needed which results in higher computational requirements.

Referring to FIG. 10A, the method according to an embodiment can be used to achieve a larger FOV, as the method will provide around a 120-degree FOV focus part in the principal viewing direction (i.e., current viewing direction). As a result, the user will, for the most part, only view a flat portion of a 3D geometry and the highest bandwidth will be assigned to the flat portion, which results in saving of user bandwidth.

Referring to FIG. 10B, if multiple faces of the cube are assigned with high resolution, most of the bandwidth is wasted as the high resolution is assigned to a whole face even though only a part of the face comes under the user FOV.

The proposed method according to an embodiment can be used to provide a better FOV in the principal direction. The method can be used to project the immersive data based on user vision and user behavior. This results in saving more bandwidth and requiring a lower number of textures for computation.

Figure 11:
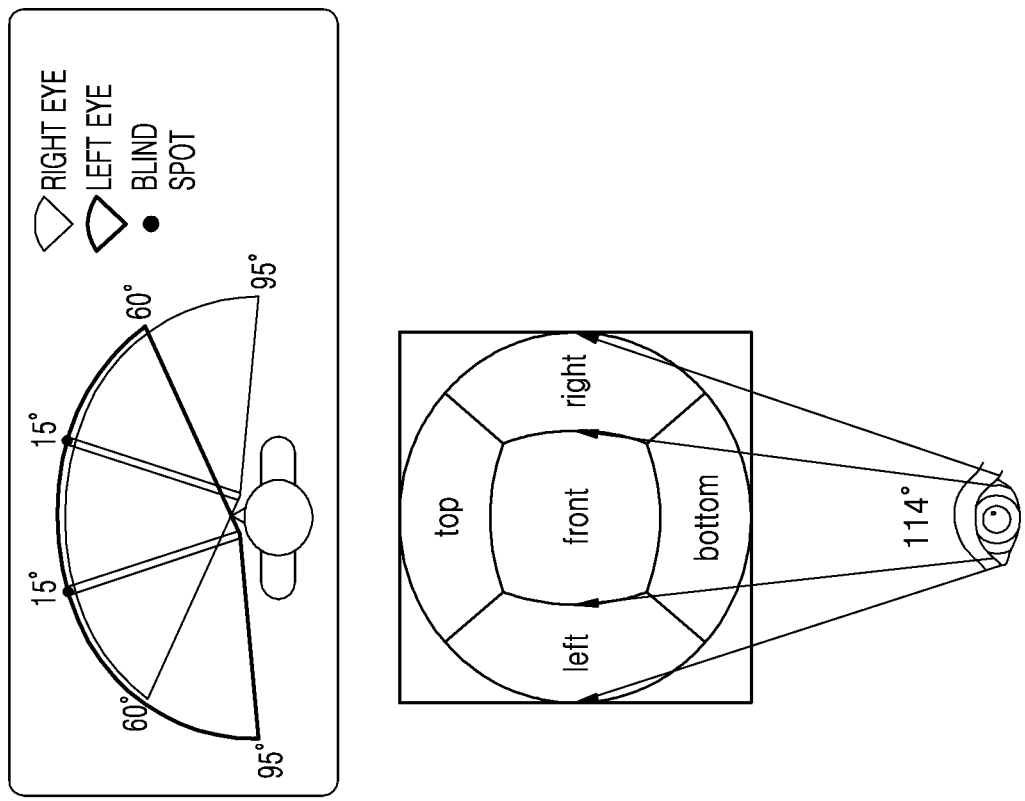
FIG. 11 illustrates immersive data projected on a single truncated paraboloid, according to an embodiment.
Figure 11:
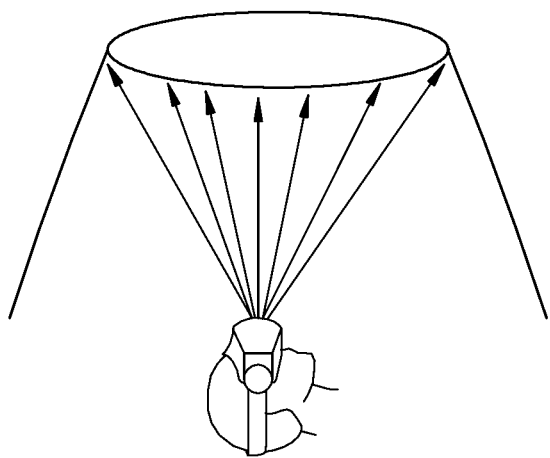

FIG. 11 illustrates the immersive data being projected on the single truncated paraboloid, according to an embodiment.

Generally, human binocular vision has a viewing angle of around 114 degrees. Taking into consideration or assuming the rarity of head movements of the user in the majority of scenarios, human color vision and form perception are concentrated in the center of the visual field. The truncated paraboloid projection is used in a focus virtual reality case, and a front side of the truncated paraboloid projection with a flat surface offers minimum distortion. Thus, the front side is the region of utmost important considering the human stereoscopic viewing angle of 114 degrees. If the system 100 considers the human perception of having a 114 degree horizontal FOV and also center-concentrated human vision, the truncated paraboloid projection is designed to closely follow human perception properties. At the same time, bandwidth and resources can be saved by allotting higher resolution to the flat plane or the truncated part of the truncated paraboloid projection and by assigning lower resolution to other parts of the truncated paraboloid projection.

In the truncated paraboloid projection, the paraboloid is cut perpendicularly to an axis. The paraboloid projection offers much less distortion than traditional dual paraboloid projection in the principal viewing area of the user.

In an example, the undistorted portion for the paraboloid projection corresponds to 50%—120 degrees of the front image. Here, as the paraboloid projection is used in a focus virtual reality case, the front side of the projection with a flat surface offers minimum distortion and that is the region of utmost important considering the human stereoscopic viewing angle of 114 degrees.

A method or process for implementing the truncated dual paraboloid according to an embodiment will now be described. In the present embodiment, paraboloid mapping is obtained from an equirectangular map, and the dual paraboloid is nearly equal to a spherical surface.

In order to create the paraboloid mapping, the system 100 according to an embodiment maps each pixel on the paraboloid to the closest possible corresponding pixel on an equirectangular image.

The system provides a pixel's coordinates as (x,y), and the (x,y,z) coordinates of the paraboloid will be calculated based on the equation of the parabola such that:

$$z=0.75-0.75(x^2+y^2) \quad \text{(Equation 1)}$$

The unit vector corresponding to this point will then be $$x_v=x/\text{sqrt}(x^2+y^2+z^2) \quad \text{(Equation 2)}$$

$$y_v=y/\text{sqrt}(x^2+y^2+z^2) \quad \text{(Equation 3)}$$

$$z_v=z/\text{sqrt}(x^2+y^2+z^2) \quad \text{(Equation 4)}$$

Given this unit vector, the system 100 can map the top half of the sphere to the top paraboloid. The corresponding point on the equirectangular (ERP) image is calculated by getting the spherical coordinates as follows:

$$v=\tan^{-1}(y_v/\text{sqrt}(x_v^2+z_v^2)) \quad \text{(Equation 5)}$$

$$\text{theta}=\tan^{-1}(x_v/z_v) \quad \text{(Equation 6)}$$

These u,v coordinates are then converted to x,y coordinates using the equations:

$$x=\text{theta}/\text{pi} \quad \text{(Equation 7)}$$

$$y=\text{phi}*2/\text{pi} \quad \text{(Equation 8)}$$

The remapping with respect to corresponding pixels on the ERP image is done using Open Source Computer Vision Library (OpenCVs) remap function with inter linear interpolation.

All points such that $x^2+y^2>=0.5$, are mapped onto a circular plane with the following equation:

$$z=0.75-0.75*0.5 \text{ and } x^2+y^2=0.5 \quad \text{(Equation 9)}$$

Based on the equation of the circle and the parabola, the calculated angle at the center of the two parabolas will be approximately 124 degrees.

The center of the two parabolas is considered as the location of the camera for the mapping. Hence we can assume that for an FOV of 120 degrees the image will be mapped onto a planar circular surface.

The truncated paraboloid according to one or more embodiments has better performance and resource/bandwidth utilization as compared to paraboloid mapping. As the system 100 can be used to truncate the paraboloid, the truncated part will have the flat geometry that has the following advantages:

a) Reduces the distortion in the principal view direction;
b) The rendering performance of the 3D geometry is improved as the flat geometry has better rendering performance; and
c) Different resolutions are provided to different portions or parts based on boundaries created or determined by the system 100. That is, maximum resolution will be provided to the truncated part that is in the principal view direction.

For 180-degree view range content, a single truncated paraboloid can be used according to an embodiment. Referring to FIG. 11, the projection is suitable for the 180-degree view range content as well. In the proposed methods, one truncated paraboloid will be used to show the 180-degree view at the same time when mapped as per normal human vision, by providing the maximum resolution at the flat surface and lower resolution at the other part, as per human stereoscopic viewing.

In truncated dual paraboloid projection, the system 100 can assign the highest resolution to the flat surface and less resolution to the remaining part(s). Furthermore, the user will not be able to detect the difference as the paraboloid covers human stereoscopic vision.

Further, the texture mapping for mapping a 180-degree equirectangular image to the truncated paraboloid includes mapping the center circle to the flat part of the truncated paraboloid and the other part to the rest of the paraboloid.

Figure 12:
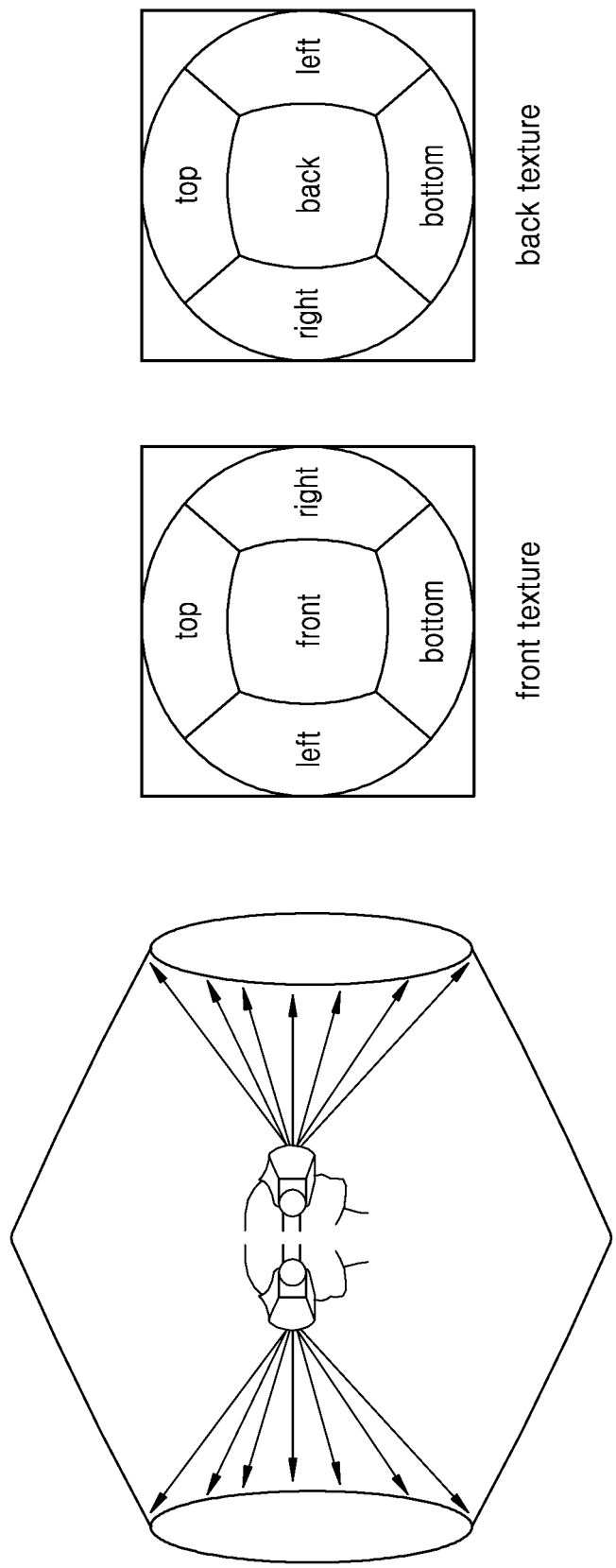
FIG. 12 illustrates immersive data projected on a dual truncated dual parboliod, according to an embodiment.

FIG. 12 is an example illustration in which immersive data is projected onto a dual truncated dual paraboloid, according to an embodiment.

In viewport based virtual reality according to an embodiment, multiple copies of a same video frame are prepared in which the system 1000 provides the highest resolution image at the truncated part of the paraboloid, while the sides gradually decrease in quality the farther they get from a flat part. By way of example, each paraboloid contains 20-30 different views and/or multiple versions of different bandwidths to support adaptive streaming.

According to another embodiment, the system 1000 can be adapted to divide the frames into multiple spatial parts and provide different connections for each spatial part of the 360-degree video. The system 1000 can output high quality video data regarding the area of high interest to the user. For the other areas, the system 100 can output low quality video data, so that the client 300 may map the different spatial parts of the frames onto a graphical mesh, e.g., a truncated paraboloid.

In the dual truncated dual paraboloid projection for the 360-degree video, the paraboloid can be divided into multiple spatial parts. For example, the system 1000 may be configured to divide the 360-degree video into two or more spatial parts, two of which are for two truncated flat parts of the paraboloid and the one or more other spatial parts for remaining parts of the front and back of the paraboloid. It is understood, however, that one or more other embodiments are not limited thereto. That is, it is understood that the 360-degree equi-rectangular spatial mapping can be done in various different ways to achieve different results.

Figure 13:
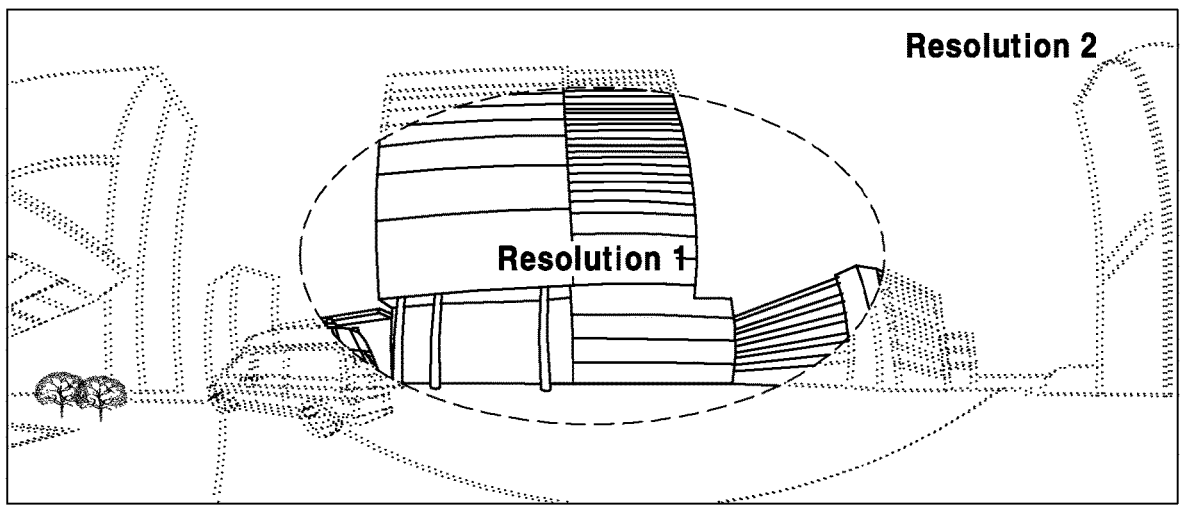
FIG. 13 illustrates an image resolution for a single truncated paraboloid, according to an embodiment.

FIG. 13 illustrates an image resolution for a single truncated paraboloid, according to an embodiment.

Figure 14:
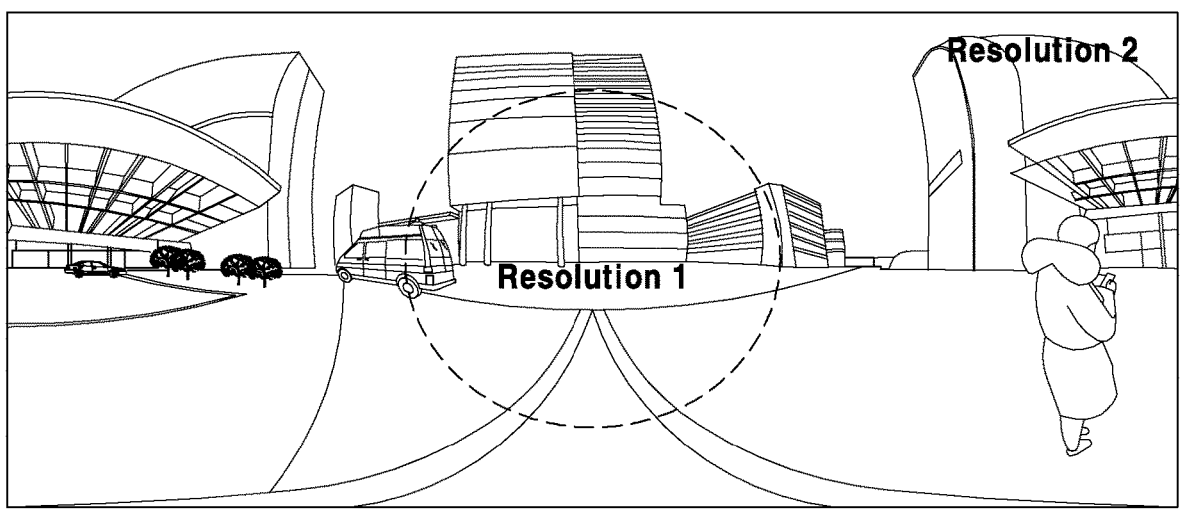
FIG. 14 illustrates an image resolution for a dual truncated dual parboliod, according to an embodiment.

FIG. 14 illustrates an image resolution for a dual truncated dual paraboloid, according to an embodiment.

Figure 15:
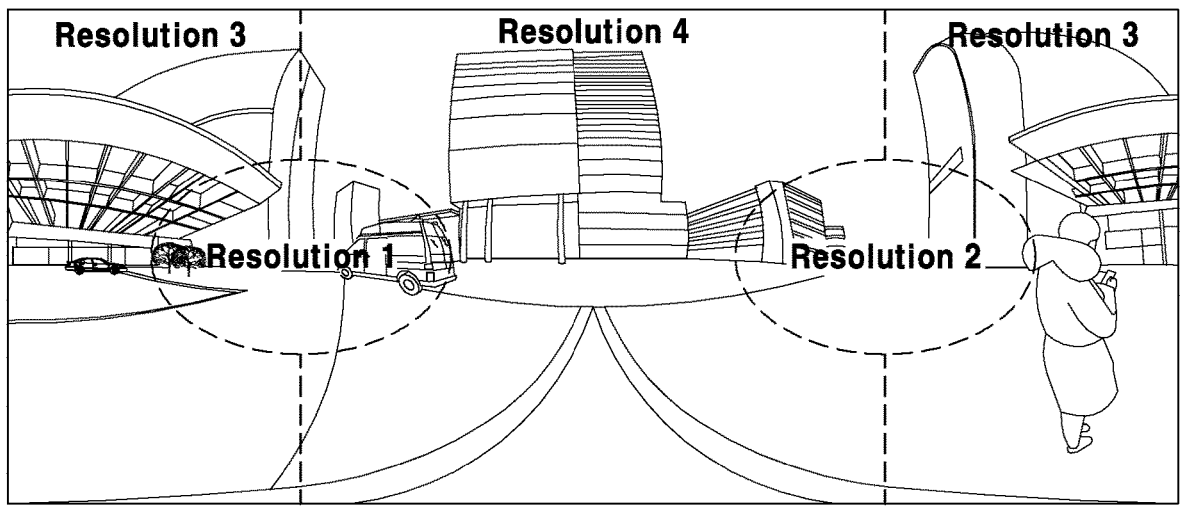
FIG. 15 illustrates an image resolution for a dual truncated dual parboliod using mapping with four spatial parts, according to an embodiment.

FIG. 15 illustrates an image resolution for a dual truncated dual paraboloid using mapping with four spatial parts, according to an embodiment.

The mapping with four spatial parts provides the following features: (a) four different resolutions can be mapped to four different sides of the dual truncated dual paraboloid; and (b) four connections to download each spatial part separately.

Figure 16:
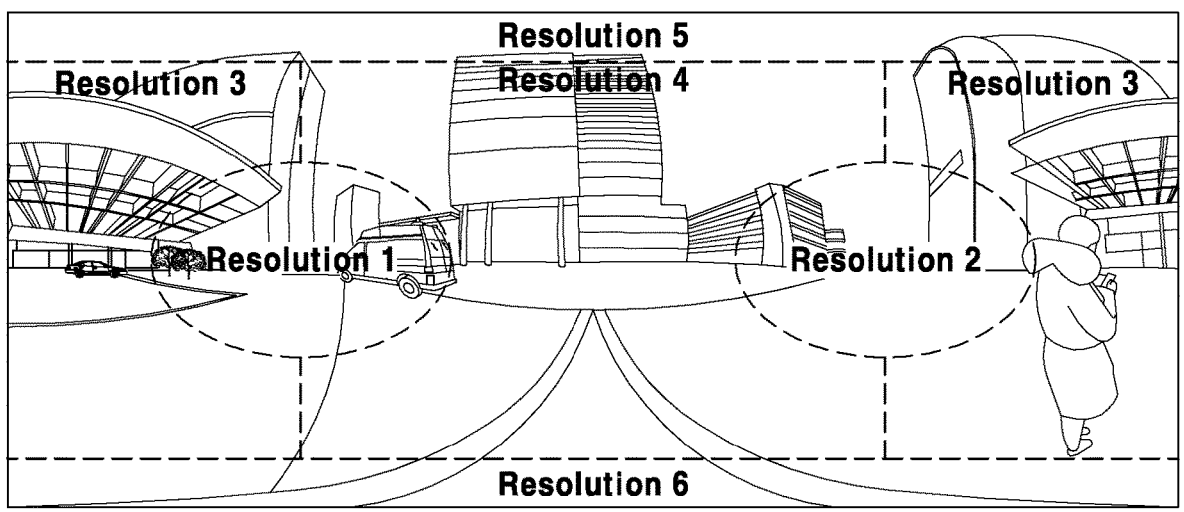
FIG. 16 illustrates an image resolution for a dual truncated dual parboliod using mapping with six spatial parts, according to an embodiment.

FIG. 16 illustrates an image resolution for a dual truncated dual paraboloid using mapping with six spatial parts, according to an embodiment.

The mapping with six spatial parts provides the following features: (a) six different resolutions can be mapped to four different sides of the dual truncated dual paraboloid; and (b) six connections to download each spatial part separately.

The method(s) according to one or more embodiments can be extended to apply the truncation to any geometry based on the user FOV and thereby save bandwidth from the remaining parts to be used to provide maximum resolution to the user FOV part.

Figure 17:
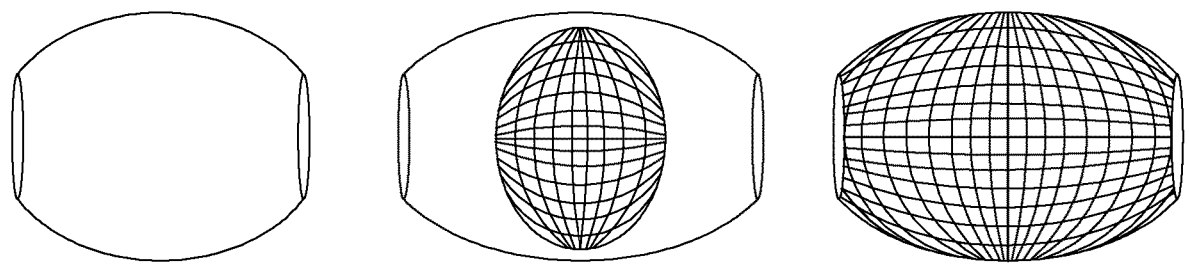
FIG. 17 illustrates truncated paraboloid mapping, according to an embodiment.

FIG. 17 illustrates truncated paraboloid mapping, according to an embodiment.

In general, the circular geometries have a problem of rendering performance as a linear mapping cannot be used in the circular geometries. This problem can be resolved by transforming a circular part in the user FOV into the truncated part that has the maximum value. This will improve the performance of the overall system, as the maximum resolution spatial part of the geometry is flat and can be processed using the linear mapping.

Figure 18:
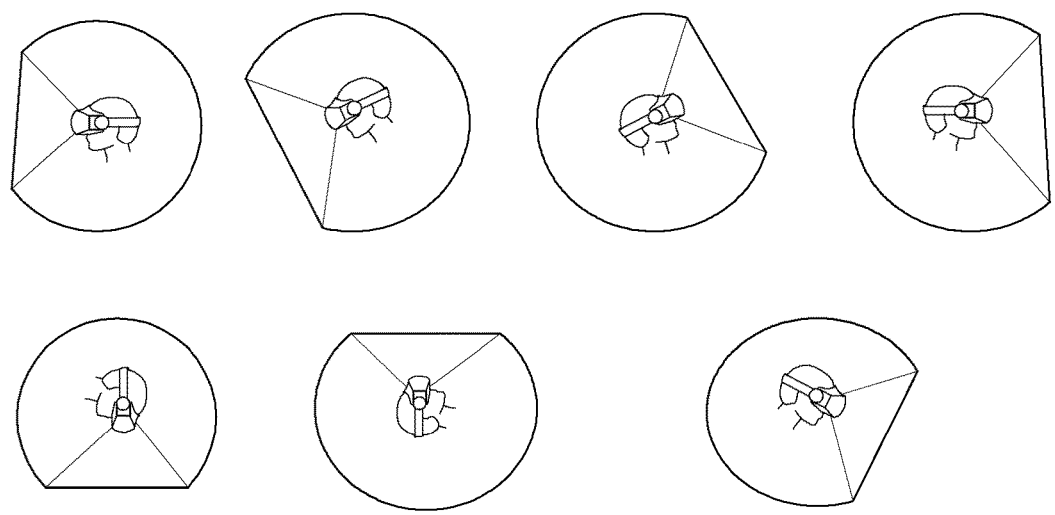
FIG. 18 illustrates dynamic truncation applied to a sphere, according to an embodiment.

FIG. 18 illustrates dynamic truncation applied to a sphere, according to an embodiment.

Figure 19:
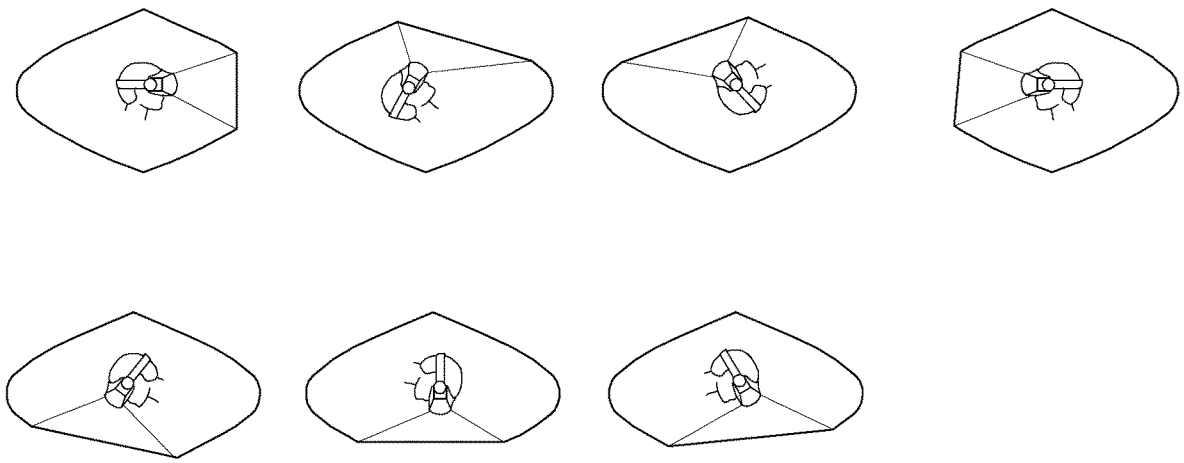
FIG. 19 illustrates dynamic truncation applied to a dual paraboloid, according to an embodiment.

FIG. 19 illustrates dynamic truncation applied to a dual paraboloid, according to an embodiment.

Figure 20:
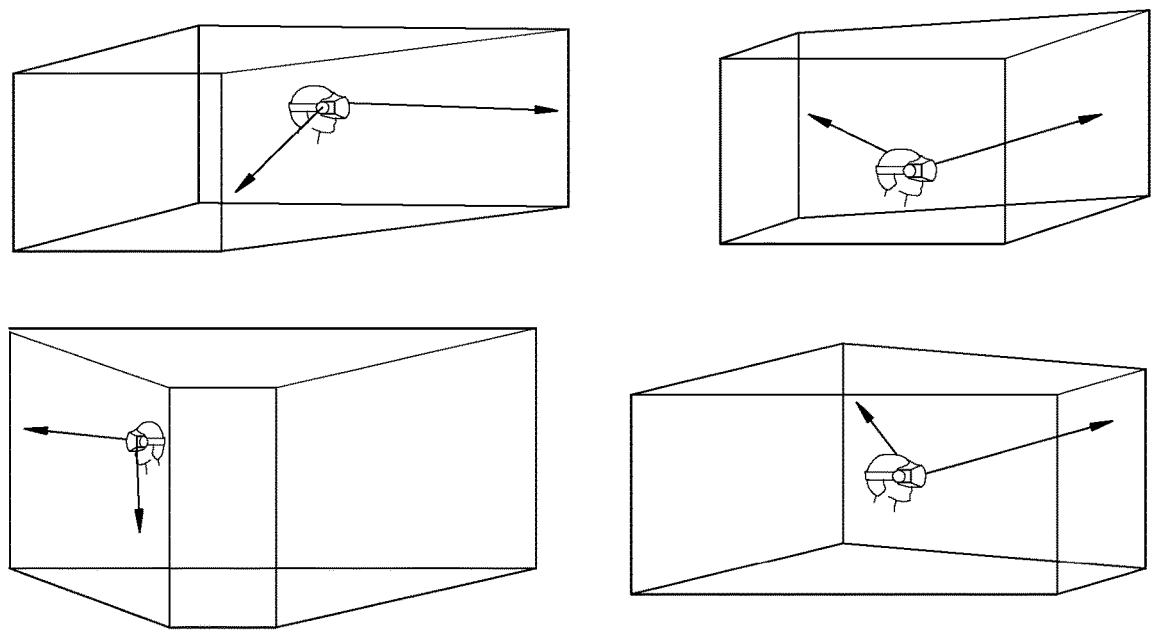
FIG. 20 illustrates dynamic truncation applied to a cube, according to an embodiment.

FIG. 20 illustrates dynamic truncation applied to a cube, according to an embodiment.

Referring to FIG. 20, the truncation can be beneficial even with the cube, which has a flat geometry, in terms of saving bandwidth. This is because dynamic truncation bandwidth can be used to save bandwidth in the cube projection in the principal view direction, when multiple faces of the cube become part of the user FOV, which can lead to a lot of bandwidth wastage. Methods according to various embodiments can be used to truncate the principal view direction of the user by keeping the same number of faces, thereby avoiding such bandwidth wastage.

Certain embodiments disclosed herein can be implemented using at least one software program running on at least one hardware device and performing network management functions to control the elements.

The foregoing description of specific embodiments will so fully reveal the general nature of the embodiments herein that others can, by applying current knowledge, readily modify and/or adapt for various applications of such specific embodiments without departing from the generic concept. Therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of example embodiments, those of ordinary skill in the art will recognize that the embodiments herein can be practiced with modifications within the spirit and scope of the embodiments as described herein.

What is claimed is:

1. A method for managing data in an immersive system, the method comprising:
generating a truncated three-dimensional (3D) geometry comprising a truncated plane only applicable to a field of view (FOV) of a user;
obtaining data comprising a plurality of frames;
mapping a frame, from among the plurality of frames, onto the truncated plane formed according to the FOV of the user; and
displaying the frame onto the FOV of the user.

2. The method of claim 1, further comprising allocating a first image resolution to the truncated plane and a second image resolution to a remaining portion of the truncated 3D geometry, the first image resolution being higher than the second image resolution.

3. The method of claim 2, wherein the second image resolution allocated to the remaining portion of the truncated 3D geometry gradually decreases in a direction away from a center of the FOV of the user.

4. The method of claim 1, further comprising in response to detecting a change of the FOV of the user, regenerating the truncated plane corresponding to the changed FOV of the user.

5. The method of claim 1, wherein the truncated 3D geometry comprises one of a truncated paraboloid, a truncated sphere, a truncated cuboid, and a truncated cube.

6. The method of claim 5, wherein the one of the truncated paraboloid, the truncated sphere, the truncated cuboid, and the truncated cube is a plane truncated perpendicular to a view direction of the user.

7. The method of claim 1, wherein the truncated plane is a flat plane perpendicular to a view direction of the user.

8. The method of claim 1, further comprising calculating the FOV of the user based on information regarding at least one of a rotation angle of a head of the user and a direction of an eye of the user.

9. The method of claim 1, further comprising:
dividing the frame, from among the plurality of frames, into a plurality of segments;
determining a current viewing segment of the user, from among the plurality of segments; and
allocating a first image resolution to the current viewing segment of the user and a second image resolution to another viewing segment other than the current viewing segment of the user,
wherein the first image resolution is higher than the second image resolution.

10. The method of claim 1, further comprising determining a number of truncated planes within a same instance of the truncated 3D geometry based on a type of content.

11. The method of claim 10, wherein the determining the number of the truncated planes comprises:
determining the number of the truncated planes as one if the type of the content is 180-degree viewing range content, substantially 180-degree viewing range content, or lower than 180-degree viewing range content; and
determining the number of the truncated planes as two or more if the type of the content is 360-degree viewing range content, substantially 360-degree viewing range content, or lower than 360-degree viewing range content.

12. An apparatus for managing data, the apparatus comprising:
a memory for storing instructions;
a display for displaying the data; and
a processor configured to execute the instructions to:
generate a truncated three-dimensional (3D) geometry comprising a truncated plane only applicable to a field of view (FOV) of a user,
obtain the data comprising a plurality of frames,
map a frame, from among the plurality of frames, onto the truncated plane formed according to the FOV of the user, and
control the display to display the frame onto the FOV of the user.

13. The apparatus of claim 12, wherein the processor is further configured to execute the instructions to allocate a first image resolution to the truncated plane and a second image resolution to a remaining portion of the truncated 3D geometry, the first image resolution being higher than the second image resolution.

14. The apparatus of claim 12, wherein the processor is further configured to, in response to detecting a change of the FOV of the user, execute the instructions to regenerate the truncated plane corresponding to the changed FOV of the user.

15. The apparatus of claim 12, wherein the truncated 3D geometry comprises one of a truncated paraboloid, a truncated sphere, a truncated cuboid, or a truncated cube.

16. The apparatus of claim 15, wherein the one of the truncated paraboloid, the truncated sphere, the truncated cuboid, and the truncated cube is a plane truncated perpendicular to a view direction of the user.

17. The apparatus of claim 12, wherein the processor is further configured to execute the instructions to calculate the FOV of the user based on information regarding at least one of a rotation angle of a head of the user and a direction of an eye of the user.

18. The apparatus of claim 12, wherein the processor is further configured to execute the instructions to:
divide the frame, from among the plurality of frames, into a plurality of segments;
determine a current viewing segment of the user, from among the plurality of segments; and
allocate a first image resolution to the current viewing segment of the user and a second image resolution to another viewing segment other than the current viewing segment of the user,
wherein the first image resolution is higher than the second image resolution.

19. The apparatus of claim 12, wherein the processor is further configured to execute the instructions to:
determine a number of truncated planes for the truncated 3D geometry as one if a type of content viewed by the user is 180-degree viewing range content, substantially 180-degree viewing range content, or lower than 180-degree viewing range content; and
determine the number of the truncated planes for the truncated 3D geometry as two or more if the type of the content viewed by the user is 360-degree viewing range content, substantially 360-degree viewing range content, or lower than 360-degree viewing range content.

20. A non-transitory computer readable medium storing instructions thereon that, when executed, cause at least one processor to perform a method, the method comprising:
generating a truncated three-dimensional (3D) geometry comprising a truncated plane only applicable to a field of view (FOV) of a user;
obtaining data comprising a plurality of frames;
mapping a frame, from among the plurality of frames, onto the truncated plane formed according to the FOV of the user; and
displaying the frame onto the FOV of the user.

21. The non-transitory computer readable medium of claim 20, wherein the method further comprises allocating a first image resolution to the truncated plane and a second image resolution to a remaining portion of the truncated 3D geometry, the first image resolution being higher than the second image resolution.

22. The non-transitory computer readable medium of claim 20, wherein the method further comprises, in response to detecting a change of the FOV of the user, regenerating the truncated plane corresponding to the changed FOV of the user.

23. The non-transitory computer readable medium of claim 20, wherein the truncated 3D geometry comprises one of a truncated paraboloid, a truncated sphere, a truncated cuboid, and a truncated cube.

24. The non-transitory computer readable medium of claim 20, wherein the method further comprises calculating the FOV of the user based on information regarding at least one of a rotation angle of a head of the user and a direction of an eye of the user.

25. The non-transitory computer readable medium of claim 20, wherein the method further comprises:
dividing the frame, from among the plurality of frames, into a plurality of segments;

determining a current viewing segment of the user, from among the plurality of segments; and allocating a first image resolution to the current viewing segment of the user and a second image resolution to another viewing segment other than the current viewing segment of the user, wherein the first image resolution is higher than the second image resolution.

26. The non-transitory computer readable medium of claim 20, wherein the method further comprises determining a number of truncated planes for the truncated 3D geometry based on a type of content.

27. An apparatus for providing immersive data, the apparatus comprising:

a memory for storing instructions; and a processor configured to execute the instructions to:
obtain data comprising a plurality of frames, and
map a frame, from among the plurality of frames, onto a truncated plane formed only to a FOV of a user, the truncated plane comprised in a truncated three-dimensional (3D) geometry.

28. The apparatus of claim 27, wherein the processor is further configured to execute the instructions to allocate a first image resolution to the truncated plane and a second image resolution to a remaining portion of the truncated 3D geometry, the first image resolution being higher than the second image resolution.

29. The apparatus of claim 27, wherein the processor is further configured to, based on a change of the FOV of the user, execute the instructions to regenerate the truncated plane corresponding to the changed FOV of the user.

30. The apparatus of claim 27, wherein the truncated 3D geometry comprises one of a truncated paraboloid, a truncated sphere, a truncated cuboid, or a truncated cube.

31. The apparatus of claim 27, wherein the FOV of the user is determined based on information regarding at least one of a rotation angle of a head of the user and a direction of an eye of the user.

32. The apparatus of claim 27, wherein the processor is further configured to execute the instructions to:

divide the frame, from among the plurality of frames, into a plurality of segments;

determine a current viewing segment of the user, from among the plurality of segments; and allocate a first image resolution to the current viewing segment of the user and a second image resolution to another viewing segment other than the current viewing segment of the user, wherein the first image resolution is higher than the second image resolution.

* * * * *